US012801212B2

(12) United States Patent
Shogome

(10) Patent No.: US 12,801,212 B2
(45) Date of Patent: *Nov. 17, 2026

(54) INFORMATION PROCESSING APPARATUS FOR ACHIEVING CROSS REALITY, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Kohei Shogome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/270,806

(22) Filed: Jul. 16, 2025

(65) Prior Publication Data

US 2025/0341884 A1 Nov. 6, 2025

Related U.S. Application Data

(63) Continuation of application No. 18/758,752, filed on Jun. 28, 2024, now Pat. No. 12,386,415.

(30) Foreign Application Priority Data

Jul. 20, 2023 (JP) ................................ 2023-118312

(51) Int. Cl.
*G06F 3/01* (2006.01)
*G06V 40/20* (2022.01)

(52) U.S. Cl.
CPC .............. *G06F 3/011* (2013.01); *G06V 40/28* (2022.01)

(58) Field of Classification Search
CPC .......... G06F 3/005; G06F 3/011; G06F 3/014; G06F 3/017; G06F 3/0304; G06F 3/0346; G06V 40/28
See application file for complete search history.

(56) References Cited

U.S. PATENT DOCUMENTS

| | | | | |
|---|---|---|---|---|
| 10,042,386 | B2 | 8/2018 | Yamada et al. | |
| 2012/0293456 | A1 | 11/2012 | Ikeda | |
| 2019/0235626 | A1 * | 8/2019 | Nishimaki | A63F 13/211 |
| 2023/0341936 | A1 | 10/2023 | Inoue | |
| 2024/0004533 | A1 | 1/2024 | Wei | |

FOREIGN PATENT DOCUMENTS

| | | | |
|---|---|---|---|
| JP | 2011076521 | A | 4/2011 |

* cited by examiner

*Primary Examiner* — Nelson M Rosario

(74) *Attorney, Agent, or Firm* — Cowan, Liebowitz & Latman, P.C.

(57) ABSTRACT

An information processing apparatus capable of promoting utilization of an input device used for operations in the XR. The information processing apparatus includes a memory device that stores a set of instructions, and at least one processor that executes the set of instructions to: detect an action of a user to change a holding hand that holds an input device as a re-holding action when the user holds the input device that allows a one-hand operation in cross reality, and determine the holding hand based on the re-holding action detected.

11 Claims, 26 Drawing Sheets

FIG. 25A

POINTING FUNCTION SET

| BUTTON | INPUT FUNCTION |
|---|---|
| BUTTON A | ENLARGE |
| BUTTON B | HIGHLIGHT |
| BUTTON C | ... |
| ... | ... |

FIG. 25B

SUPPORT FUNCTION SET

| BUTTON | INPUT FUNCTION |
|---|---|
| BUTTON A | PAGE FEEDING |
| BUTTON B | PAGE RETURNING |
| BUTTON C | ... |
| ... | ... |

*FIG. 26A*

DOMINANT HAND FUNCTION SET

| BUTTON | INPUT FUNCTION |
|---|---|
| BUTTON A | ROTATION OF BIT |
| BUTTON B | REPLACEMENT OF BIT |
| BUTTON C | ... |
| ... | ... |

*FIG. 26B*

NON-DOMINANT HAND FUNCTION SET

| BUTTON | INPUT FUNCTION |
|---|---|
| BUTTON A | VOLUME UP |
| BUTTON B | VOLUME DOWN |
| BUTTON C | ... |
| ... | ... |

INFORMATION PROCESSING APPARATUS FOR ACHIEVING CROSS REALITY, CONTROL METHOD THEREFOR, AND STORAGE MEDIUM STORING CONTROL PROGRAM THEREFOR

CROSS-REFERENCE TO RELATED APPLICATION

This application is a continuation of application Ser. No. 18/758,752, filed Jun. 28, 2024, the entire disclosure of which is hereby incorporated by reference.

BACKGROUND OF THE INVENTION

Field of the Invention

The present invention relates to an information processing apparatus, a control method therefor, and a storage medium storing a control program therefor.

Description of the Related Art

In recent years, development of XR (cross reality) has been spectacular. The XR is a technology for achieving fusion of a real world and a virtual world, and is a general term for VR (virtual reality), AR (augmented reality), and MR (mixed reality). A user mainly uses a dedicated controller (hereinafter referred to as an XR controller) for operations in the XR. There are XR controllers of various types, such as a generic rod-shaped type (hereinafter referred to as a gripping type) that is gripped by a user, a type (hereinafter referred to as a wearing type) that can be worn by a user, such as a wristwatch, a wrist ring, or a ring. An XR controller generally has a function of tracking its position and orientation by using an acceleration sensor, a gyrosensor, or a geomagnetic sensor. Further, XR controllers include a type consisting of a pair of components that are respectively gripped or worn by both hands of a user (hereinafter referred to as a two-hand controller) and a type consisting of a single component that is gripped or worn by one hand of a user (hereinafter referred to as a one-hand controller).

When a user uses the one-hand controller, a hand that does not grip or ware the one-hand controller becomes a free hand. Accordingly, there are merits that the user can perform a hand gesture operation or touch an object in a real world with the free hand. In the meantime, the one-hand controller has a disadvantage that physical input members such as buttons is approximately halved as compared with the two-hand controller. In the XR, there are few spatial restrictions, and the XR controller is used in a wide range of situations. Therefore, when a user uses a one-hand controller among XR controllers, the user may change a hand that grasps or wears (hereinafter, referred to "holds") the one-hand controller, unlike a conventional controller for non-XR use, such as a mouse, operated by a dominant hand of the user. As described above, since the one-hand controller is assumed to be used by a right hand or a left hand of a user, the one-hand controller has a top and bottom and is designed to be bilaterally symmetrical.

In the following description, a change of a hand holding the one-hand controller is referred to as "re-holding". The hand of the user holding the one-hand controller is denoted by a "holding hand". In a case of re-holding, for example, if input functions corresponding to the holding hand or the dominant hand can be allocated to the input members of the one-hand controller at a re-holding timing, utilization of the one-hand controller is promoted. For this purpose, it is required to automatically determine the holding hand. In this regard, Japanese Patent Laid-Open Publication No. 2011-76521 (counterpart of U.S. Pat. No. 10,042,386 B2) discloses a technique for determining a hand of a user holding a personal digital assistant based on a moving direction of a finger of the user operating a touch panel. There is an XR controller of a type having a touch pad as an input member. Therefore, the technique described in this publication is applicable to an XR controller having a touch pad.

However, the technique described in the above publication requires a user to perform a notification of a re-holding timing and a specific operation to determine a holding hand in order to determine a holding hand at a re-holding timing. Therefore, the technique described in the above publication is difficult to automatically determine a holding hand at a re-holding timing, and thus the utilization of one-hand controller cannot be promoted.

SUMMARY OF THE INVENTION

The present invention provides an information processing apparatus, a control method therefor, and a storage medium storing a control program therefor, which are capable of promoting utilization of an input device used for operations in the XR.

Accordingly, an aspect of the present invention provides an information processing apparatus including a memory device that stores a set of instructions, and at least one processor that executes the set of instructions to: detect an action of a user to change a holding hand that holds an input device as a re-holding action when the user holds the input device that allows a one-hand operation in cross reality, and determine the holding hand based on the re-holding action detected.

Accordingly, an aspect of the present invention provides an information processing apparatus including a detection unit configured to detect an action of a user to change a holding hand that holds an input device as a re-holding action when the user holds the input device that allows a one-hand operation in cross reality, and a first determination unit configured to determine the holding hand based on the re-holding action detected by the detection unit.

According to the present invention, the utilization of the input device used for operations in the XR is promoted. Further features of the present invention will become apparent from the following description of exemplary embodiments with reference to the attached drawings.

BRIEF DESCRIPTION OF THE DRAWINGS

FIGS. 25A and 25B are views respectively showing an example of a pointing function set and an example of a support function set in the fourth embodiment.

FIG. 26A and FIG. 26B are views respectively showing an example of a dominant-hand function set and an example of a non-dominant-hand function set in the fifth embodiment.

DESCRIPTION OF THE EMBODIMENTS

Figure 1:
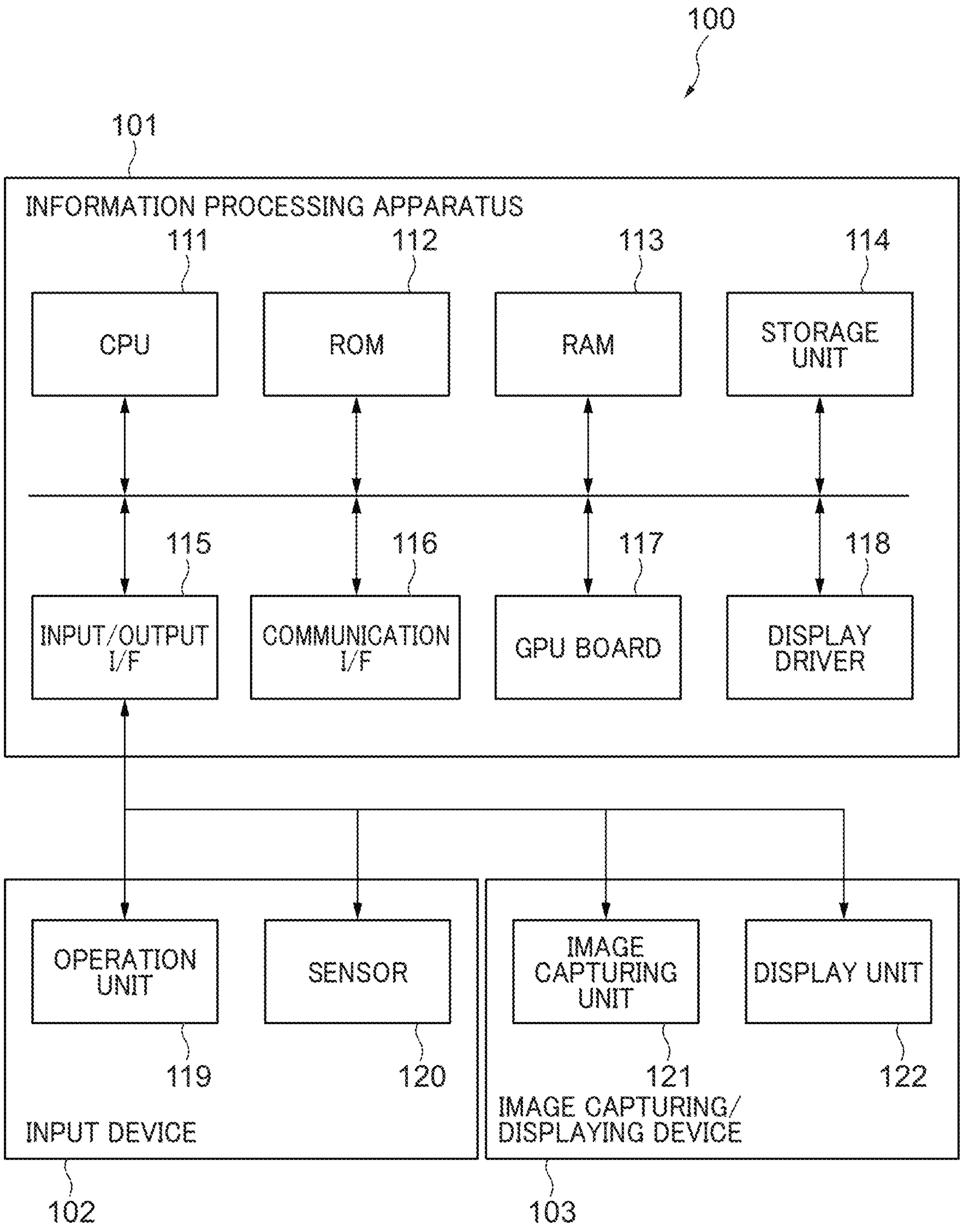
FIG. 1 is a view showing a configuration example of an information processing system in each embodiment.

Hereafter, embodiments according to the present invention will be described in detail by referring to the drawings. However, configurations described in the following embodiments are merely examples, and the scope of the present invention is not limited by the configurations described in the embodiments. For example, each unit constituting the present invention can be replaced with any configuration capable of exhibiting the same function. Further, an arbitrary component may be added. Any two or more configurations (features) of the embodiments can be combined. In the embodiments, the same components are denoted by the same reference numerals. Different thresholds and different predetermined times are used depending on usages as described below.

Figure 2:
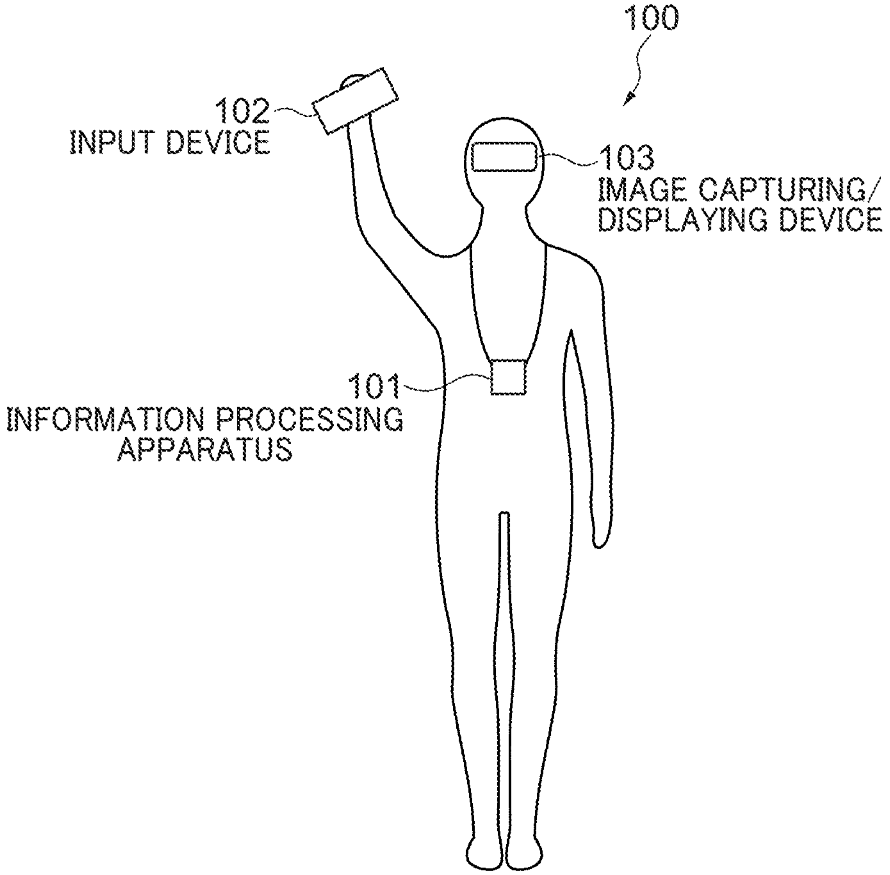
FIG. 2 is a view showing a relationship between an information processing apparatus, an input device, and an image capturing/displaying device when the information processing system provides a user with an XR in each embodiment.

Hereinafter, a first embodiment will be described with reference to FIGS. 1 to 8. FIG. 1 is a view showing a configuration example of an information processing system 100. The information processing system 100 provides a user with cross reality (XR), which is a technology for achieving fusion of a real world and a virtual world. As shown in FIG. 1, the information processing system 100 has an information processing apparatus 101, an input device 102, and an image capturing/displaying device 103. FIG. 2 is a view showing a relationship between the information processing apparatus 101, the input device 102, and the image capturing/displaying device 103 when the information processing system 100 provides a user with the XR in each embodiment. As shown in FIG. 2, the information processing apparatus 101 is a small box computer that a user can shoulder mount. The information processing apparatus 101 is not limited to this, and may be a portable computer such as a tablet PC or a smartphone.

The input device 102 is a one-hand controller that allows a one-hand operation in the XR. The image capturing/displaying device 103 is an HMD (a head mounted display) that can be mounted on the head of the user. In the first embodiment, the input device 102 and the image capturing/displaying device 103 are components outside the information processing apparatus 101. However, the image capturing/displaying device 103 can be treated as the information processing apparatus 101 of the present invention as long as the image capturing/displaying device 103 has an information processing function of the information processing apparatus 101 in the first embodiment described later. This point is the same in second to fifth embodiments.

The description returns to FIG. 1. The information processing apparatus 101 includes a CPU 111, a ROM 112, a RAM 113, a storage unit 114, an input/output I/F (interface) 115, a communication I/F 116, a GPU board 117, and a display driver 118. The input device 102 includes an operation unit 119 and a sensor 120. The image capturing/displaying device 103 includes an image capturing unit 121 and a display unit 122. In the information processing apparatus 101, the CPU 111 is a system controller that controls the entire information processing apparatus 101. The CPU 111 achieves the information processing function of the first embodiment by executing an information processing program.

The ROM 112 is a read-only memory in which programs and parameters that do not need changes (e.g., a basic program, initial date, etc.) are stored. The RAM 113 is a memory for temporarily storing input information, a calculation result in an information process, a calculation result in an image process, etc. The storage unit 114 is a device capable of writing and reading various kinds of information. The storage unit 114 may be a hard disk, a memory card, a removable disk, an IC card, etc. The hard disk can be built in or externally attached to the information processing apparatus 101. The removable disk or the IC card can be attached to and detached from the information processing apparatus 101. The memory card can be built in, externally attached, or attached to and detached from the information processing apparatus 101. The information processing program is recorded in the storage unit 114, read from the storage unit 114, developed onto the RAM 113, and executed by the CPU 111. The information processing program may be stored in the ROM 112. The storage unit 114 may also store required date utilized by the information processing program executed by the CPU 111.

The input/output I/F 115 accepts input and output of required date. The required data includes controller input data from the operation unit 119 of the input device 102, sensor input data from the sensor 120 of the input device 102, image capturing data from the image capturing unit 121 of the image capturing/displaying device 103, and display data to the display unit 122 of the image capturing/displaying device 103. The input/output connection form by the input/output I/F 115 includes both wired connection by a USE cable or the like and wireless connection by Bluetooth or the like. The communication I/F 116 is an interface that enables the information processing apparatus 101 to perform data transmission and reception with an outside like a cloud via the Internet.

The GPU board 117 is a general-purpose graphic board, and performs processes such as image generation and image synthesis. For example, the GPU board 117 can generate a virtual object and a virtual space, and perform a synthesis process of the virtual object, the virtual space, and a reality image, according to an operation using the one-hand controller. Accordingly, the GPU board 117 can generate a virtual image or a virtual reality image. The virtual object and the virtual space may be generated in advance and recorded in the storage unit 114. The display driver 118 is software for controlling a display device that is the display unit 122 of the image capturing/displaying device 103 via the input/output I/F 115.

In the input device 102, the operation unit 119 is an input member of the one-hand controller, and includes a button, a trigger, a dial, a thumb stick, a trackpad, etc., and can obtain an operation instruction, a command, etc. from a user. The sensor 120 is a sensing component to obtain a position and an orientation of the one-hand controller and their changes, and includes an acceleration sensor, a gyrosensor, etc. The acceleration sensor can sense a translational motion of the one-hand controller. The gyrosensor can sense a rotational motion of the one-hand controller. In the image capturing/displaying device 103, the image capturing unit 121 is a camera mounted on the HMD. A reality image captured by the image capturing unit 121 is subjected to image recognition and used for specifying a gravity center of a hand of a user and a position of a joint of the hand, tracking and analyzing a motion of the hand of the user and a movement of the one-hand controller, and specifying a position at which the virtual object and the virtual space are superimposed. The display unit 122 is an electronic display mounted on the HMD as a display device. The display unit 122 displays a virtual image and a virtual reality image generated by the GPU board 117 of the information processing apparatus 101.

Figure 3:
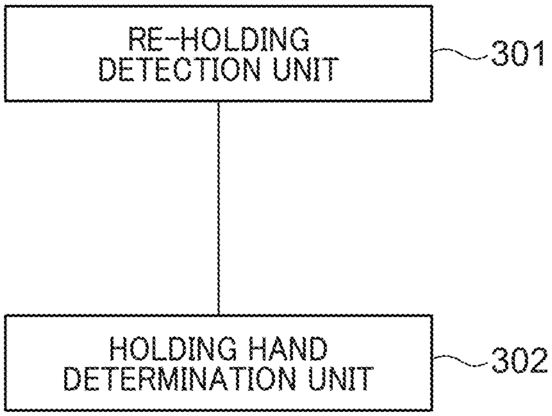
FIG. 3 is a block diagram showing a functional configuration of the information processing apparatus in first, second, and third embodiments.

FIG. 3 is a block diagram showing a functional configuration of the information processing apparatus 101. The information processing apparatus 101 includes a re-holding detection unit 301 (detection unit) and a holding hand determination unit 302 (first determination unit) as the functional configuration. The re-holding detection unit 301 detects a re-holding action. The re-holding action means a behavior of the one-hand controller and a behavior of the user's hand when the user changes the hand holding the one-hand controller. The holding hand determination unit 302 determines a holding hand. More specifically, the holding hand determination unit 302 determines whether the one-hand controller is held by the left hand or the right hand of the user by analyzing the re-holding action detected by the re-holding detection unit 301. The re-holding detection unit 301 can detect the re-holding action by a method using image recognition using a reality image captured by the camera of the HMD, a method using sensor information from the one-hand controller, etc. Further, the method of determining the holding hand by the holding hand determination unit 302 depends on the method of detecting the re-holding action by the re-holding detection unit 301. The detection and determination methods will be described in detail later.

Figure 4:
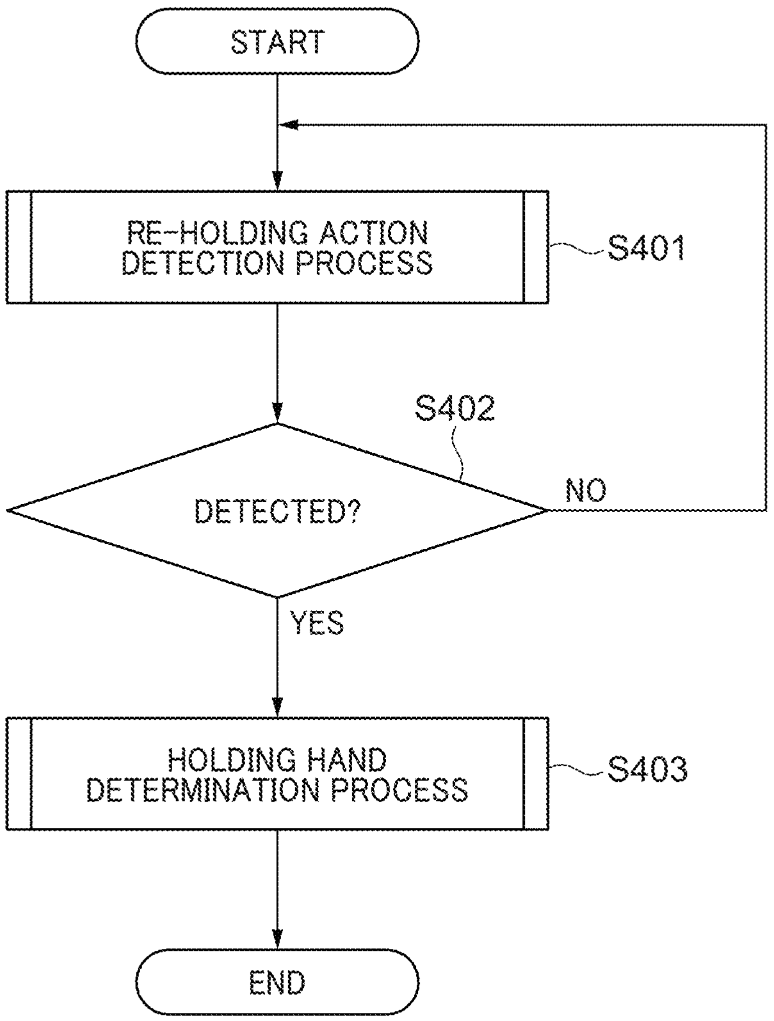
FIG. 4 is a flowchart showing a flow of a process of the information processing apparatus in the first, second, and third embodiments.

FIG. 4 is a flowchart showing a flow of a process of the information processing apparatus 101 in the first embodiment. The flow of the process of the information processing apparatus 101 (a control method of the information processing apparatus) shown in the flowchart in FIG. 4 is achieved by the CPU 111 (a computer) developing the information processing program stored in the storage unit 114 onto the RAM 113 and executing the information processing program. In a step S401, the re-holding detection unit 301 performs a re-holding action detection process (a detection step). In this process, the re-holding action is detected by the re-holding detection unit 301. The process in the step S401 will be described in detail in a description of a subroutine.

In a step S402, it is determined whether the re-holding detection unit 301 detects the re-holding action. When it is determined that the re-holding detection unit 301 detects the re-holding action, the process proceeds to a step S403. In the meantime, when it is determined that the re-holding detection unit 301 does not detect the re-holding action, the process returns to the step S401. In the step S403, the holding hand determination unit 302 performs the holding hand determination process (a first determination process). In this process, the holding hand determination unit 302 determines the holding hand. The process in the step S403 will be described in detail in a description of a subroutine. After the process in the step S403 is performed, the flowchart in FIG. 4 ends.

Figure 5:
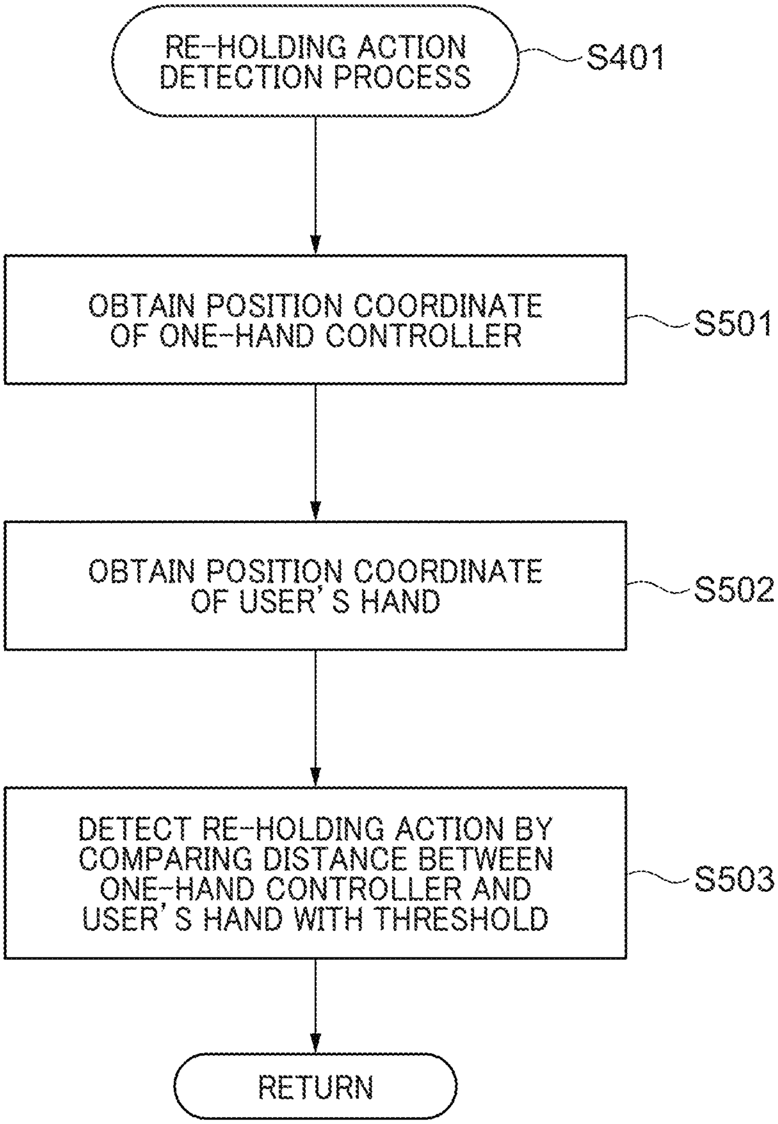
FIG. 5 is a flowchart showing a flow of a re-holding action detection process in the first embodiment.
Figure 6:
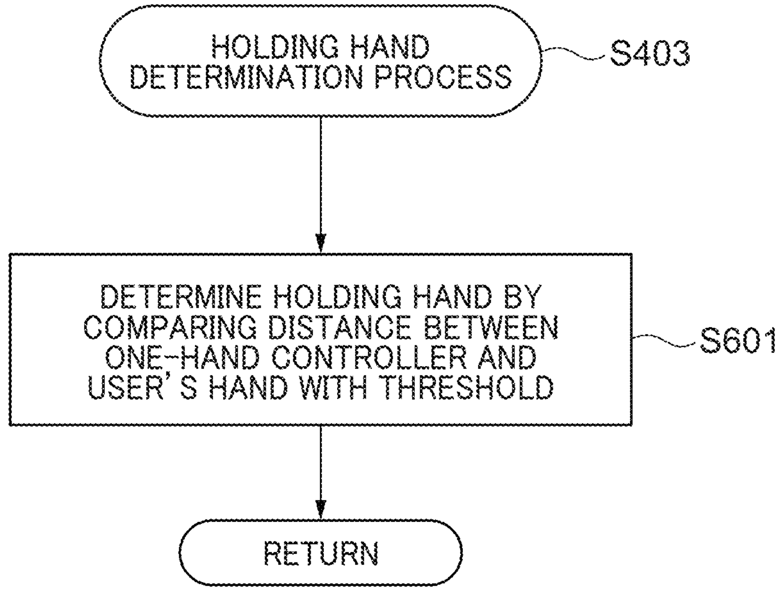
FIG. 6 is a flowchart showing a flow of a holding hand determination process in the first embodiment.
Figure 7:
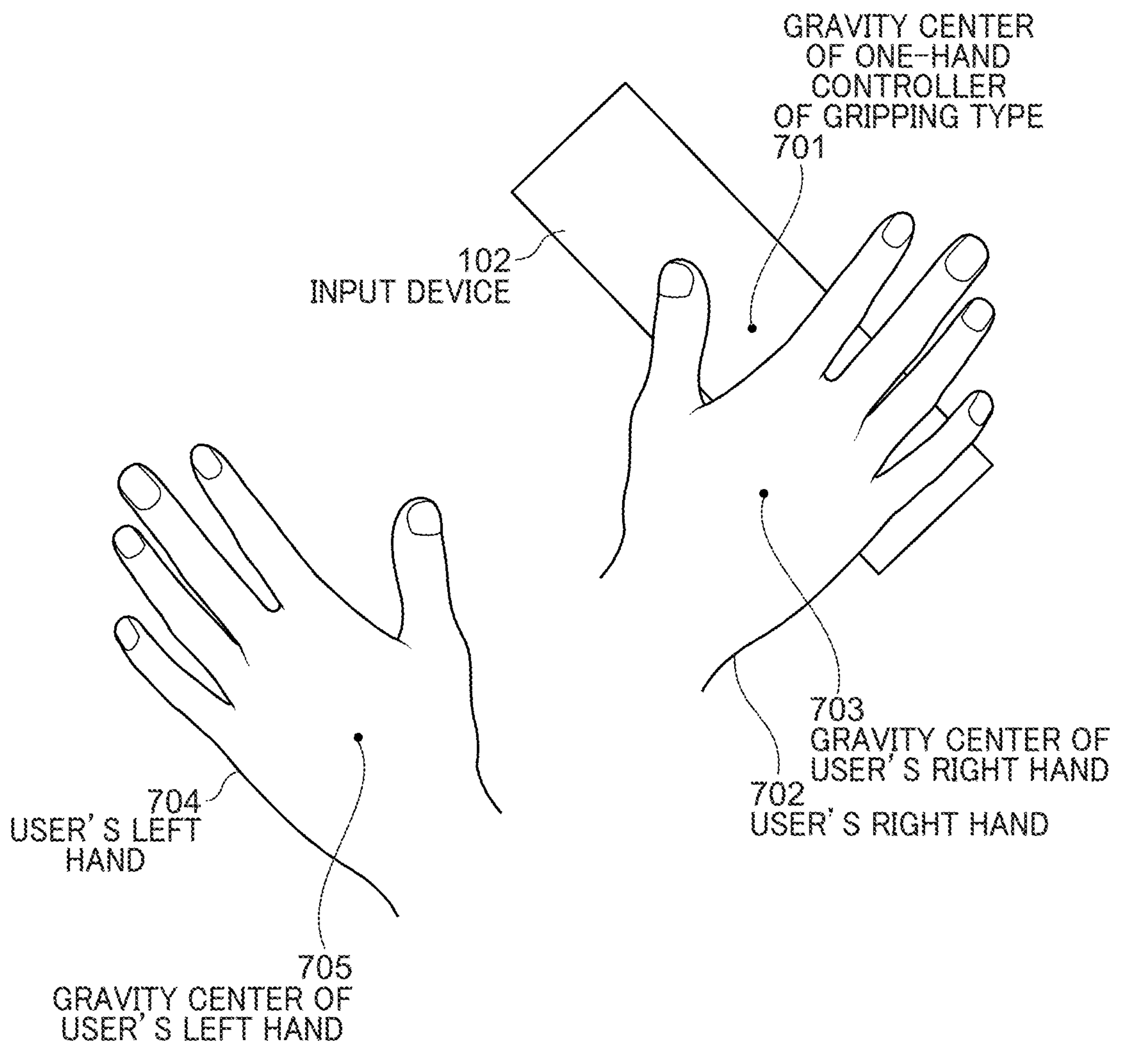
FIG. 7 is a view showing an example of a situation where detection of a re-holding action of a one-hand controller of a gripping type and determination of a holding hand are performed by tracking by image recognition in the first embodiment.
Figure 8:
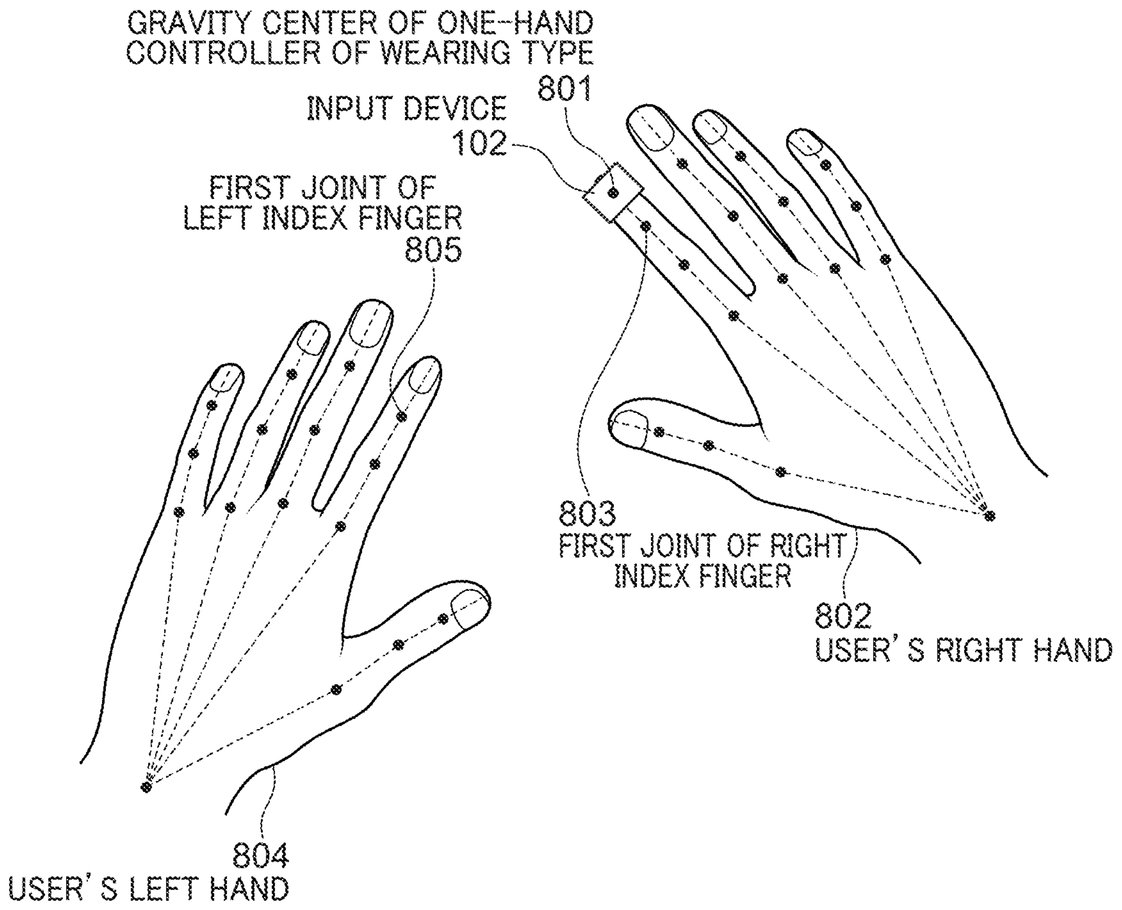
FIG. 8 is a view showing an example of a situation where detection of a re-holding action of a one-hand controller of a wearing type and determination of a holding hand are performed by tracking by image recognition in the first embodiment.

Hereinafter, the re-holding action detection process performed in the step S401 and the holding hand determination process performed in the step S403 will be described with reference to FIGS. 5 to 8. In the first embodiment, the re-holding action detection process in the step S401 and the holding hand determination process in the step S403 are performed by the image recognition that tracks both the user's hands and the one-hand controller based on the reality image captured by the camera of the HMD from a user's viewpoint. FIG. 5 is a flowchart showing a flow of the subroutine in the step S401, that is, the re-holding action detection process in the first embodiment. FIG. 6 is a flowchart showing a flow of the subroutine in the step S403, that is, the holding hand determination process in the first embodiment. FIG. 7 is a view showing an example of a situation where detection of a re-holding action of the one-hand controller of a gripping type (hereinafter, it may be abbreviated as a "gripping type") and determination of a holding hand are performed by tracking by image recognition. FIG. 8 is a view showing an example of a situation where detection of a re-holding action of the one-hand controller of a wearing type (hereinafter, it may be abbreviated as a "wearing type") and determination of a holding hand are performed by tracking by image recognition.

First, the re-holding action detection process performed in the step S401 will be described with reference to FIGS. 5, 7, and 8. As shown in FIG. 5, in the subroutine of the re-holding action detection process in the step S401, the re-holding detection unit 301 obtains a position coordinate of a gravity center of the one-hand controller by the image recognition in a step S501. Thus, the position of the input device 102 is estimated. Specifically, when the input device 102 is the gripping type as shown in FIG. 7, the re-holding detection unit 301 obtains a position coordinate of a gravity center 701 of the one-hand controller of the gripping type by the image recognition. When the input device 102 is the wearing type as shown in FIG. 8, the re-holding detection unit 301 obtains a position coordinate of a gravity center 801 of the one-hand controller of the wearing type by the image recognition.

The description returns to FIG. 5. In a step S502, the re-holding detection unit 301 obtains a position coordinate of the user's hand by the image recognition. Specifically, when the input device 102 is the gripping type as shown in FIG. 7, the re-holding detection unit 301 obtains a position coordinate of a gravity center 703 of a user's right hand 702 and a position coordinate of a gravity center 705 of a user's left hand 704 by the image recognition. Thus, the positions of both the user's hands in the case where the input device 102 is the gripping type are estimated. When the input device 102 is the wearing type as shown in FIG. 8, the re-holding detection unit 301 obtains a position coordinate of a first joint 803 of an index finger of a user's right hand 802 and a position coordinate of a first joint 805 of an index finger of a user's left hand 804 by the image recognition. Thus, the positions of both the user's hands in the case where the input device 102 is the wearing type are estimated. The re-holding detection unit 301 may obtain the position coordinates of joints of the user's right hand 802 and the user's left hand 804 by the image recognition. Further, the re-holding detection unit 301 may obtain position coordinates of specific joints other than the first joints 803 and 805 of the index fingers among the joints of the user's right hand 802 and the user's left hand 804 by the image recognition.

The description returns to FIG. 5. In step S503, the re-holding detection unit 301 detects the re-holding action by comparing the distance from the one-hand controller to the user's hand with a threshold. At this time, the re-holding detection unit 301 calculates the distance from the one-hand controller to the user's hand using the position coordinates obtained in the steps S501 and S502. Specifically, in the case where the input device 102 is the gripping type as shown in FIG. 7, the re-holding detection unit 301 shall detect the re-holding action when the distance from the gravity center 701 of the one-hand controller to the gravity center 703 of the user's right hand 702 increases to be equal to or more than a threshold from a value less than the threshold. In the meantime, the re-holding detection unit 301 shall not detect the re-holding action unless the distance from the gravity center 701 of the one-hand controller to the gravity center 703 of the user's right hand 702 increases to be equal to or more than the threshold from a value less than the threshold. These points are the same for the gravity center 705 of the user's left hand 704.

In the case where the input device 102 is the wearing type as shown in FIG. 8, the re-holding detection unit 301 shall detect the re-holding action when the distance from the gravity center 801 of the one-hand controller to the first joint 803 of the index finger of the user's right hand 802 increases to be equal to or more than a threshold from a value less than the threshold. In the meantime, the re-holding detection unit 301 shall not detect the re-holding action unless the distance from the gravity center 801 of the one-hand controller to the first joint 803 of the index finger of the user's right hand 802 increases to be equal to or more than the threshold from a value less than the threshold. These points are the same for the first joint 805 of the index finger of the user's left hand 804. In addition, when the position coordinates of the joints of the user's right hand 802 and the user's left hand 804 are obtained, the re-holding detection unit 301 may detect the re-holding action based on the positions of the joints other than the first joints 803 and 805 of the index fingers. In addition, when the position coordinates of specific joints other than the first joints 803 and 805 of the index fingers among the joints of the user's right hand 802 and the user's left hand 804, the re-holding detection unit 101 may detect the re-holding action based on the positions of the specific joints. The description returns to FIG. 5. After the process in the step S503 is performed, the process of the flowchart in FIG. 5 is terminated, and the process returns to the flowchart in FIG. 4.

The holding hand determination process performed in the step S403 will now be described with reference to FIGS. 6, 7 and 8. As shown in FIG. 6, in the subroutine of the holding hand determination process performed in the step S403, the holding hand determination unit 302 determines the holding hand by comparing the distance from the one-hand controller to the user's hand with a threshold in a step S601. At this time, the holding hand determination unit 302 uses the distance calculated in the step S503 as the distance from the one-hand controller to the user's hand.

Specifically, in the case where the input device 102 is the gripping type as shown in FIG. 7, the holding hand determination unit 302 determines that the user's right hand 702 is the holding hand when the distance from the gravity center 701 of the one-hand controller to the gravity center 703 of the user's right hand 702 is less than a threshold. This point is the same for the gravity center 705 of the user's left hand 704. However, when both the distances from the one-hand controller to the gravity centers of the user's right hand 702 and the user's left hand 704 are less than the threshold, the holding hand determination unit 302 determines that the hand having the shorter distance is the holding hand. Thus, even when both the user's hands might be determined as the holding hands, the holding hand determination unit 302 determines that one of the user's right hand 702 and the user's left hand 704 is the holding hand. In the case shown in FIG. 7, the user's right hand 702 is determined as the holding hand.

In the case where the input device 102 is the wearing type as shown in FIG. 8, the holding hand determination unit 302 determines that the user's right hand 802 is the holding hand when the distance from the gravity center 801 of the one-hand controller to the first joint 803 of the index finger of the user's right hand 802 is less than a threshold. This point is the same for the first joint 805 of the index finger of the user's left hand 804. However, when both the distances from the one-hand controller to the first joints of the index fingers of the user's right hand 802 and the user's left hand 804 are less than the threshold, the holding hand determination unit 302 determines that the hand having the shorter distance is the holding hand. Thus, even when both the user's hands might be determined as the holding hands, the holding hand determination unit 302 determines that one of the user's right hand 802 and the user's left hand 804 is the holding hand. In the case shown in FIG. 8, the user's right hand 802 is determined as the holding hand. The description returns to FIG. 6. After the process in the step S601 is performed, the process in the flowchart in FIG. 6 is terminated, and the process returns to the flowchart in FIG. 4.

The information processing apparatus 101 according to the first embodiment tracks the one-hand controller and the user's hand by the image recognition using the reality image from the user's viewpoint, and obtains the position coordinate of the one-hand controller and the position coordinate of the user's hand. Further, the information processing apparatus 101 calculates the distance from the one-hand controller to the user's hand using the position coordinate of the one-hand controller and the position coordinate of the user's hand, and compares the calculated distance with the threshold, thereby detecting the re-holding action and determining the holding hand. Thus, the information processing apparatus 101 automatically determines the holding hand at the re-holding timing, which promotes the utilization of the input device 102 used for operations in the XR.

A position coordinate used in the first embodiment may be a two-dimensional position coordinate obtained by recognition of a simple planar image, or may be a three dimensional position coordinate obtained by recognition of a stereo image or by using a radar technique in combination. Further, the tracking of the one-hand controller and the user's hand by the image recognition may be performed by using infrared light other than visible light. In this case, the one-hand controller as the input device 102 is provided with an infrared light emitting device, and the camera of the HMD as the image capturing/displaying device 103 is provided with an infrared camera. Further, the image recognition may be performed using reality image captured by a camera from a third person's viewpoint. In this case, the camera is installed around the user or held by a third person, for example, in order to secure the third person's viewpoint.

In addition, when the user's hand or the one-hand controller is outside the angle of view of the camera of the HMD, the information processing apparatus 101 cannot detect the re-holding action and cannot determine the holding hand by the image recognition. In such a case, the information processing apparatus 101 may maintain the current determination result about the holding hand in order to avoid a situation in which the holding hand is unknown. Further, the information processing apparatus 101 may improve the accuracy of the determination of the holding hand by excluding a user's hand that cannot be a holding hand from a determination target of a holding hand based on the relative position between a user's hand and the camera of the HMD. In addition, when it is confirmed by the image recognition that the one-hand controller overlaps only one user's hand, the information processing apparatus 101 may determine that the overlapped user's hand is the holding hand. In addition, when it is confirmed by the image recognition that the one-hand controller does not overlap one user's hand, the information processing apparatus 101 may estimate that the other user's hand is the holding hand.

Hereinafter, a second embodiment will be described with reference to FIGS. 9 to 14. Hereinafter, differences from the first embodiment will be mainly described. In the second embodiment, the re-holding action detection process in the step S401 and the holding hand determination process in the step S403 are performed using information from the acceleration sensor included in the one-hand controller. Specifically, a re-holding action is detected and a holding hand is determined based on a characteristic of an acceleration change or a speed change of the one-hand controller, which is generated when the one-hand controller collides with a palm or a finger of the user and is detected by the acceleration sensor at the time of re-holding. The input device 102 can be treated as the information processing apparatus 101 of the present invention as long as it has the information processing function of the information processing apparatus 101 in the second embodiment described later. This point is the same in third to fifth embodiments.

Figure 9:
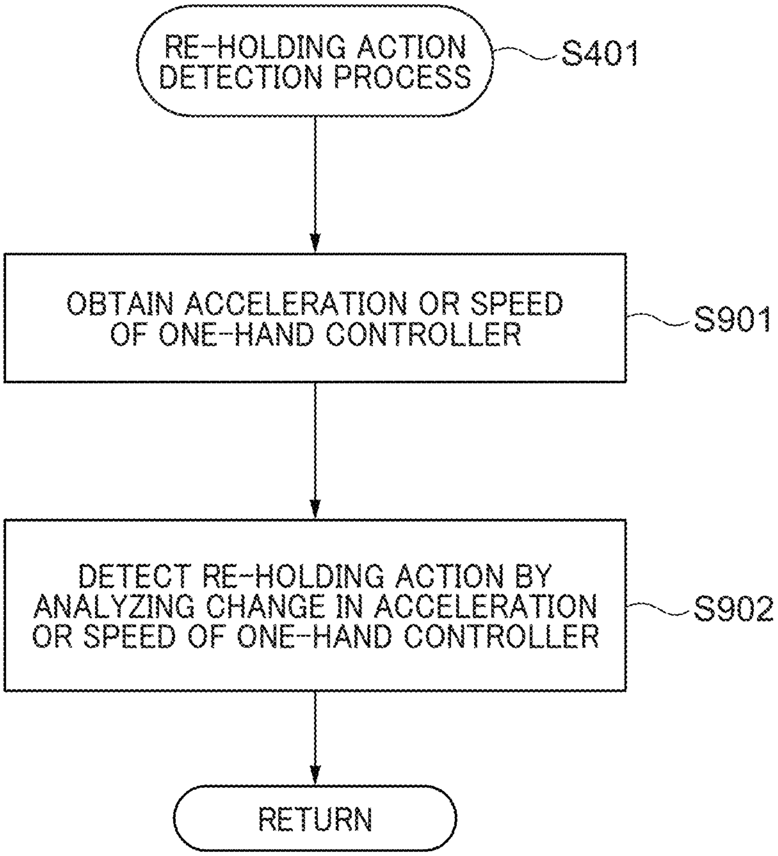
FIG. 9 is a flowchart showing a flow of a re-holding action detection process in the second embodiment.
Figure 10:
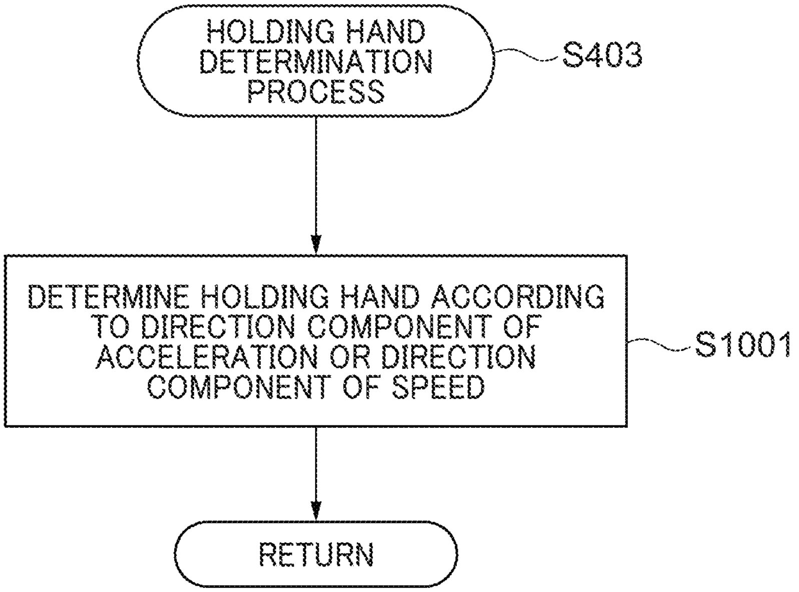
FIG. 10 is a flowchart showing a flow of a holding hand determination process in the second embodiment.
Figure 11:
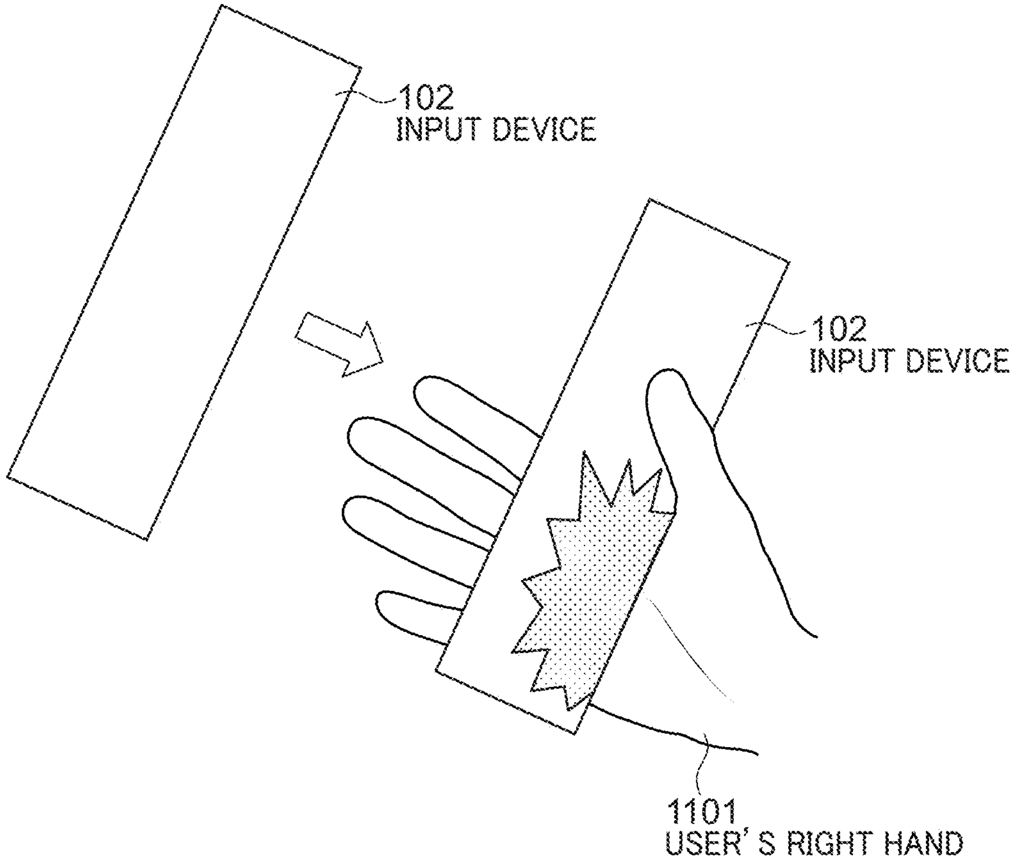
FIG. 11 is a view showing an example of a situation where detection of a re-holding action of the one-hand controller of the gripping type and determination of a holding hand are performed by using information from an acceleration sensor in the second embodiment.
Figure 12:
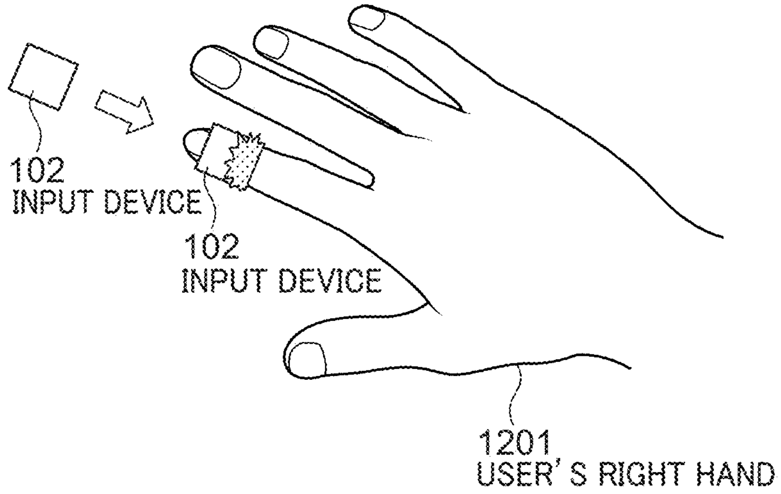
FIG. 12 is a view showing an example of a situation where detection of a re-holding action of the one-hand controller of the wearing type and determination of a holding hand are performed using information from the acceleration sensor in the second embodiment.

FIG. 9 is a flowchart showing a flow of the subroutine in the step S401, i.e., the re-holding action detection process in the second embodiment. FIG. 10 is a flowchart showing a flow of the subroutine in the step S403, i.e., the holding hand determination process in the second embodiment. FIG. 11 is a view showing an example of a situation where detection of a re-holding action of the one-hand controller of the gripping type and determination of a holding hand are performed by using information from the acceleration sensor. FIG. 11 shows a situation in which the one-hand controller of the gripping type, which is the input device 102, collides with the user's right hand 1101 at the time of re-holding. FIG. 12 is a view showing an example of a situation where detection of a re-holding action of the one-hand controller of the wearing type and determination of a holding hand are performed by using information from the acceleration sensor. FIG. 11 shows a situation in which the one-hand controller of the wearing type, which is the input device 102, collides with an index finger of the user's right hand 1201 at the time of re-holding.

Figure 13:
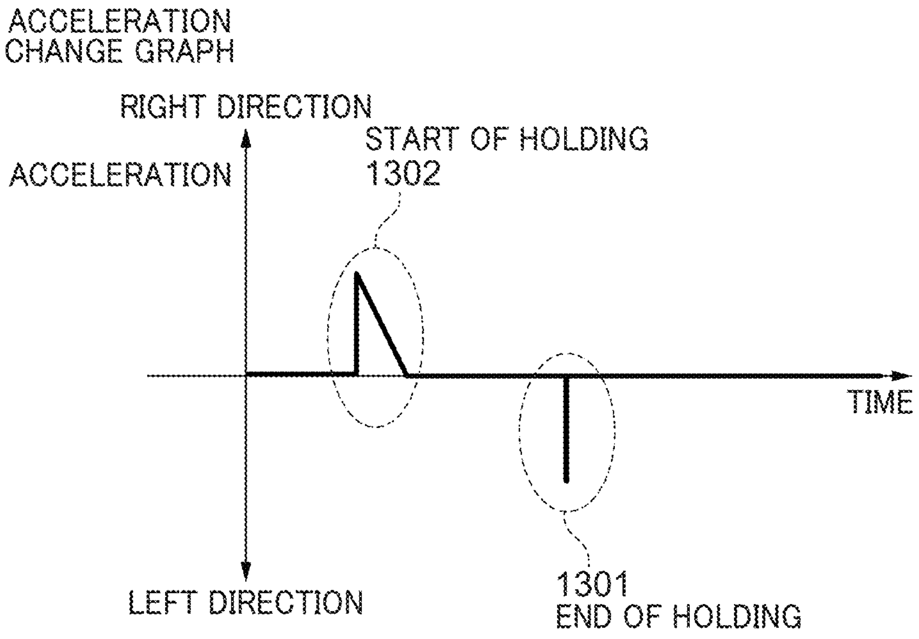
FIG. 13 is a graph showing an example of an acceleration change of the one-hand controller at the time of re-holding in the second embodiment.
Figure 14:
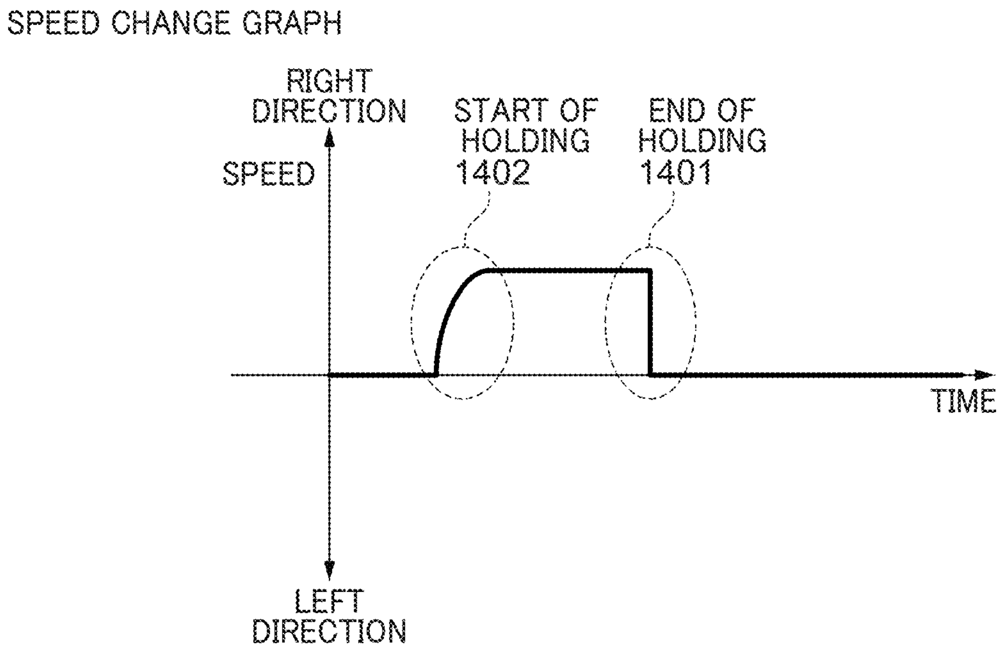
FIG. 14 is a graph showing an example of a speed change of the one-hand controller in re-holding in the second embodiment.

FIG. 13 is a graph showing an example of an acceleration change of the one-hand controller at the time of re-holding. That is, the graph in FIG. 13 shows an example of a relationship between the acceleration of the one-hand controller obtained by the acceleration sensor and time lapse. FIG. 14 is a graph showing an example of a speed change of the one-hand controller at the time of re-holding. That is, the graph in FIG. 14 shows an example of a relationship between the speed of the one-hand controller obtained by the acceleration sensor and time lapse. In the graphs in FIG. 13 and FIG. 14, a positive direction (upward) of a vertical axis indicates the right direction of the one-hand controller, a negative direction (downward) of the vertical axis indicates the left direction of the one-hand controller, and a positive direction (rightward) of a horizontal axis indicates the time lapse. The graph in FIG. 13 shows an example of the relationship between the acceleration and the time lapse when the user changes the holding hand of the one-hand controller to the user's right hand 1101 or 1201 as shown in FIG. 11 or FIG. 12. In the same manner, the graph in FIG. 14 shows an example of the relationship between the speed and the time lapse when the user changes the holding hand of the one-hand controller to the user's right hand 1101 or 1201 as shown in FIG. 11 or FIG. 12.

First, the re-holding action detection process in the step S401 in the second embodiment will be described with reference to FIG. 9 and FIGS. 11 to 14. The re-holding action detection process in the step S401 is executed similarly regardless of whether the input device 102 is the gripping type shown in FIG. 11 or the input device 102 is the wearing type shown in FIG. 12. As shown in FIG. 9, in the subroutine of the re-holding action detection process in the step S401, the re-holding detection unit 301 obtains the acceleration or the speed of the one-hand controller from the acceleration sensor in a step S901. In a step S902, the re-holding detection unit 301 detects the re-holding action by analyzing the acceleration change or the speed change of the one-hand controller.

Specifically, when the acceleration of the one-hand controller is obtained from the acceleration sensor as shown in FIG. 13, the re-holding detection unit 301 detects a spot 1301 as a characteristic of the acceleration change of the one-hand controller that occurs at the time of re-holding. As a result of this, the re-holding action is detected. The spot 1301 indicates the end of holding of the one-hand controller by the user. The acceleration of the one-hand controller that varies from 0 to a value of which an absolute value is equal to or more than a threshold in a predetermined time period returns to 0 in the spot 1301.

In the graph in FIG. 13, the acceleration of the one-hand controller varies in a spot 1302, which indicates the start of holding of the one-hand controller by the user, to be similar to the variation in the spot 1301. The re-holding detection unit 301 distinguishes the spot 1302 from the spot 1301 by using another evaluation item different from an evaluation item for the spot 1301, for example, by adjusting the predetermined time period. In this way, the re-holding detection unit 301 distinguishes between the spot 1302 indicating the start of holding of the one-hand controller by the user and the spot 1301 indicating the end of holding of the one-hand controller by the user. Therefore, the re-holding detection unit 301 may improve the detection accuracy by detecting the re-holding action when the start of holding and the end of holding of the one-hand controller by the user occur within a certain time period.

In the meantime, when the speed of the one-hand controller is obtained from the acceleration sensor as shown in FIG. 14, the re-holding detection unit 301 detects a spot 1401 as a characteristic of the speed change of the one-hand controller that occurs at the time of re-holding. Thus, the re-holding action is detected. The spot 1401 indicates the end of holding of the one-hand controller by the user. The speed of the one-hand controller varies from a value of which an absolute value is equal to or more than a threshold to 0 in the spot 1401.

In the graph in FIG. 14, the speed of the one-hand controller varies from 0 to a value of which an absolute value is equal to or more than the threshold within a predetermined time period in a spot 1402 indicating the start of holding of the one-hand controller, which is contrary to the variation in the spot 1401. Therefore, the re-holding detection unit 301 distinguishes between the spot 1402 indicating the start of holding of the one-hand controller by the user and the spot 1401 indicating the end of holding of the one-hand controller by the user. Therefore, even when the re-holding detection unit 301 obtains the speed of the one-hand controller from the acceleration sensor, the re-holding detection unit 101 may improve the detection accuracy by detecting the re-holding action when the start of holding and the end of holding of the one-hand controller by the user occur within a certain time period. The description returns to FIG. 9. After the process in the step S902 is performed, the flowchart in FIG. 9 is terminated, and the process returns to the flowchart in FIG. 4.

It should be noted that the acceleration change or the speed change due to the re-holding action is a unique change. This is different from an acceleration change or a speed change due to an action other than the re-holding action, for example, shake of the user's hand. Thus, the re-holding detection unit 301 distinguishes between the acceleration change or the speed change of the re-holding action and an acceleration change or a speed change of another action.

Next, the holding hand determination process in the second embodiment performed in the step S403 will be described with reference to FIGS. 10 to 14. The holding hand determination process in the step S403 is executed similarly regardless of whether the input device 102 is the gripping type shown in FIG. 11 or the input device 102 is the wearing type shown in FIG. 12. As shown in FIG. 10, in the subroutine of the holding hand determination process performed in the step S403, the holding hand determination unit 302 determines the holding hand according to a direction component of the acceleration or a direction component of the speed in a step S1001. At this time, the re-holding detection unit 301 obtains the direction component of the acceleration or the direction component of the speed from the detection result in the step S902, that is, from the spot indicating the end of holding of the one-hand controller by the user.

Specifically, when the acceleration of the one-hand controller obtained from the acceleration sensor is a negative value as shown in the spot 1301 in FIG. 13, that is, when the direction component is in the left direction, it is determined that the user's right hand is the holding hand. When the acceleration of the one-hand controller in the spot indicating the end of holding of the one-hand controller by the user is a positive value, which is contrary to the value in the spot 1301, that is, when the direction component is in the right direction, it is determined that the user's left hand is the holding hand. In the meantime, when the speed of the one-hand controller obtained from the acceleration sensor is a positive value as shown in the spot 1401 in FIG. 14, that is, when the direction component is in the right direction, it is determined that the user's right hand is the holding hand. When the speed of the one-hand controller in the spot indicating the end of holding of the one-hand controller by the user is a negative value, which is contrary to the value in the spot 1401, that is, when the direction component is in the left direction, it is determined that the user's left hand is the holding hand. The description returns to FIG. 10. After the process in the step S1001 is performed, the flowchart in FIG. 10 is terminated, and the process returns to the flowchart in FIG. 4.

An acceleration change or a speed change in putting the one-hand controller on a desk by the user is similar to the acceleration change or the speed change at the end of holding of the one-hand controller by the user. However, even if the holding hand is determined based on the acceleration change or the speed change in putting the one-hand controller on the desk by the user and some setting is performed, the setting is ignored because the setting is eventually the setting at an unused time.

As mentioned above, the information processing apparatus 101 according to the second embodiment obtains the acceleration or the speed of the one-hand controller. Further, the information processing apparatus 101 detects the re-holding action and determines the holding hand by detecting the characteristic of the acceleration change or the speed change when the one-hand controller collides with the palm or the finger of the user based on the obtaining result of the acceleration or the speed of the one-hand controller. Accordingly, the information processing apparatus 101 automatically determines the holding hand at the re-holding timing, which promotes the utilization of the input device 102 used for operations in the XR.

When the user re-holds the one-hand controller without moving it, the acceleration change or the speed change of the one-hand controller in the re-holding action is slight. Therefore, the manufacturer notifies a user that it is difficult to detect a re-holding action and to determine a holding hand when the user performs a re-holding action without moving the one-hand controller through a user's manual. Further, an acceleration change and a speed change in an actual re-holding action are not represented by a simple combination of line segments as shown in FIGS. 13 and 14. Tendencies of an acceleration change and a speed change also vary among individual users who perform re-holding actions. Therefore, the information processing apparatus 101 may improve the accuracy of the detection of a re-holding action by the re-holding detection unit 301 and the accuracy of the determination of a holding hand by the holding hand determination unit 302 by accumulating data indicating acceleration changes and speed changes in re-holding actions and subjecting the data to machine learning and deep learning.

Hereinafter, a third embodiment will be described with reference to FIGS. 15 to 20 and FIGS. 21A and 21B. Hereinafter, differences from the first embodiment will be mainly described. In the third embodiment, the re-holding action detection process in the step S401 and the holding hand determination process in the step S403 are performed using information from the gyrosensor included in the one-hand controller. Specifically, at the time of re-holding, a re-holding action is detected and a holding hand is determined based on a characteristic of an angular speed change or an angular change of the one-hand controller captured by the gyrosensor under a rule that the user holds the one-hand controller after rotating the one-hand controller. According to the rule in the third embodiment, the user rotates the one-hand controller in the right direction when the user changes the hand holding the one-hand controller to the right hand from the left hand, and the user rotates the one-hand controller in the left direction when the user changes the hand holding the one-hand controller to the left hand from the right hand.

Figure 15:
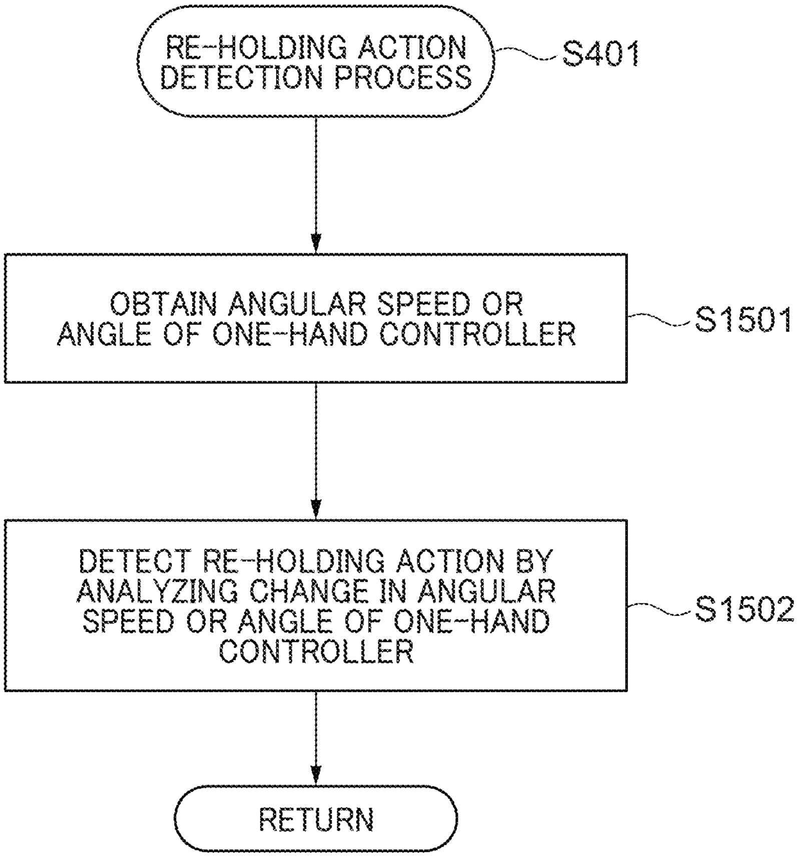
FIG. 15 is a flowchart showing a flow of a re-holding action detection process in the third embodiment.
Figure 16:
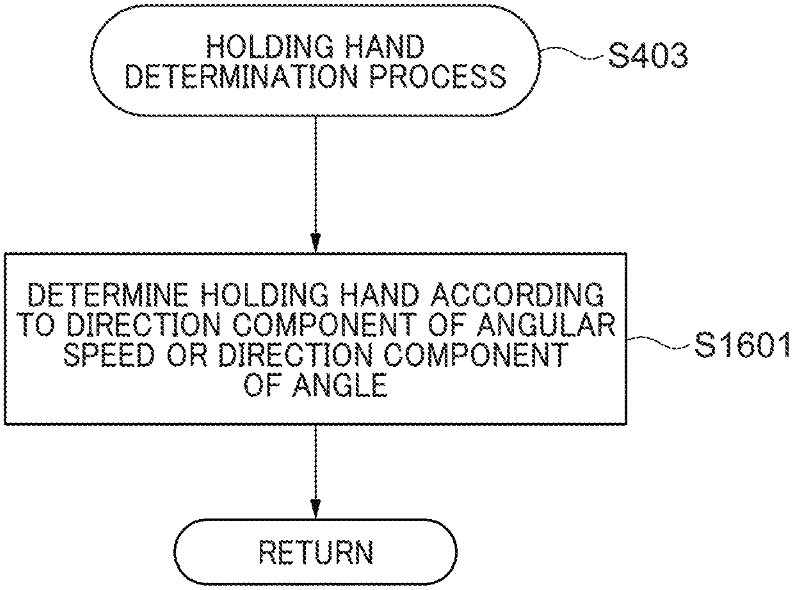
FIG. 16 is a flowchart showing a flow of a holding hand determination process in the third embodiment.
Figure 17:
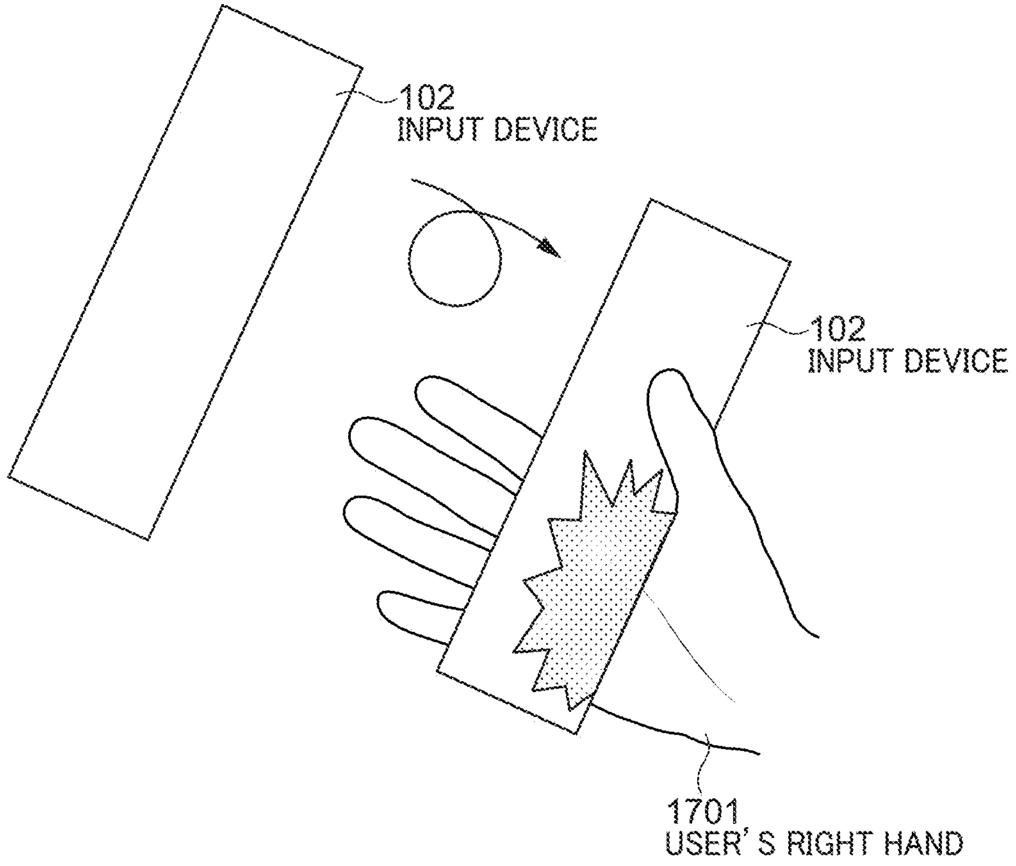
FIG. 17 is a view showing an example of a situation where detection of a re-holding action of the one-hand controller of the gripping type and determination of a holding hand are performed by using information from a gyrosensor in the third embodiment.
Figure 18:
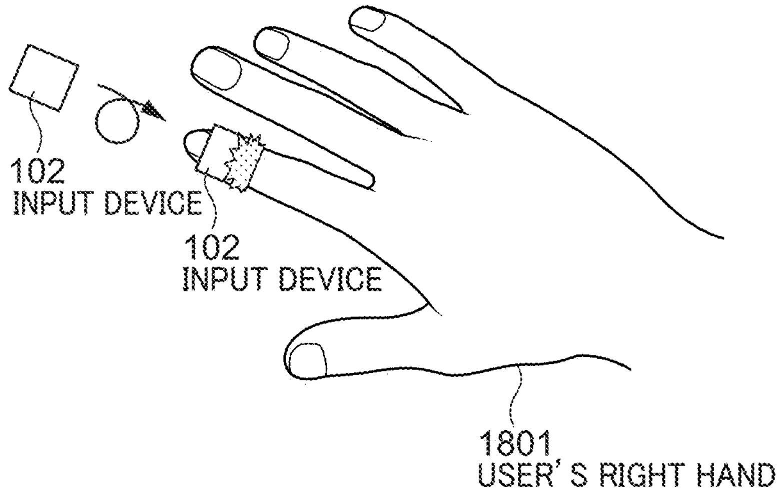
FIG. 18 is a view showing an example of a situation where detection of a re-holding action of the one-hand controller of the wearing type and determination of a holding hand are performed by using the information from the gyrosensor in the third embodiment.

FIG. 15 is a flowchart showing a flow of a subroutine in the step S401, that is, a re-holding action detection process in the third embodiment. FIG. 16 is a flowchart showing a flow of a subroutine in the step S403, that is, a holding hand determination process in the third embodiment. FIG. 17 is a view showing an example of a situation where detection of a re-holding action of the one-hand controller of the gripping type and determination of a holding hand are performed by using information from the gyrosensor in the third embodiment. FIG. 17 shows a situation in which the one-hand controller of the gripping type, which is the input device 102, collides with a user's right hand 1701 after right rotation in accordance with to the rule at the time of re-holding. FIG. 18 is a view showing an example of a situation where detection of a re-holding action of the one-hand controller of the wearing type and determination of a holding hand are performed by using the information from the gyrosensor in the third embodiment. FIG. 18 shows a situation in which the one-hand controller of the wearing type, which is the input device 102, collides with an index finger of a user's right hand 1801 after right rotation according to the rule at the time of re-holding.

Figure 19:
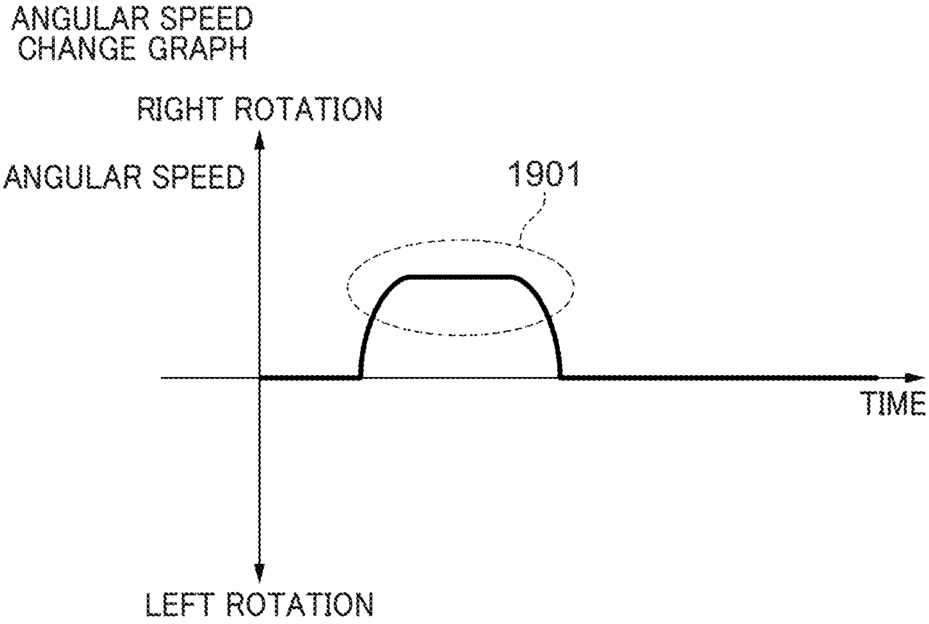
FIG. 19 is a graph showing an example of an angular speed change of the one-hand controller at the time of re-holding in the third embodiment.
Figure 20:
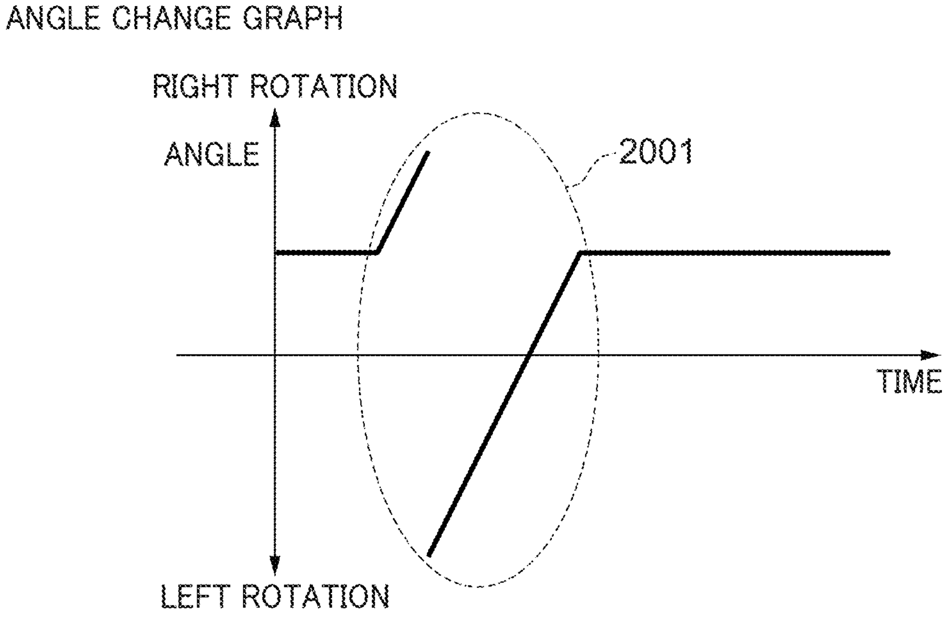
FIG. 20 is a graph showing an example of an angular change of the one-hand controller at the time of re-holding in the third embodiment.

FIG. 19 is a graph showing an example of an angular speed change of the one-hand controller at the time of re-holding. That is, the graph in FIG. 19 shows an example of a relationship between the angular speed and time lapse of the one-hand controller obtained by the gyrosensor at the time of re-holding. FIG. 20 is a graph showing an example of an angular change of the one-hand controller at the time of re-holding. That is, the graph in FIG. 20 shows an example of a relationship between the angle of the one-hand controller obtained by the gyrosensor and time lapse at the time of re-holding. In the graphs in FIGS. 19 and 20, a positive (upper) direction of a vertical axis represents right rotation of the one-hand controller, a negative (lower) direction of the vertical axis represents left rotation of the one-hand controller, and the positive (right) direction of a horizontal axis represents time lapse.

Further, in the graph of the angular change in FIG. 20, right rotation is limited by 180 degrees and left rotation is limited by −180 degrees. When the angle changes beyond a limit, right and left shall be inverted. In the graph of the angular change in FIG. 20, the state in which the top and bottom of the one-hand controller are correct shall be no-rotation (0 degrees). The graph in FIG. 19 shows an example of the relationship between the angular speed and the time lapse of the one-hand controller when the user changes the hand holding the one-hand controller to the right hand 1701 or 1801 as shown in FIG. 17 or FIG. 18. Similarly, the graph in FIG. 20 shows an example of the relationship between the angle of the one-hand controller and the time lapse when the user changes the hand holding the one-hand controller to the right hand 1701 or 1801 as shown in FIG. 17 or FIG. 18.

Figure 21A:
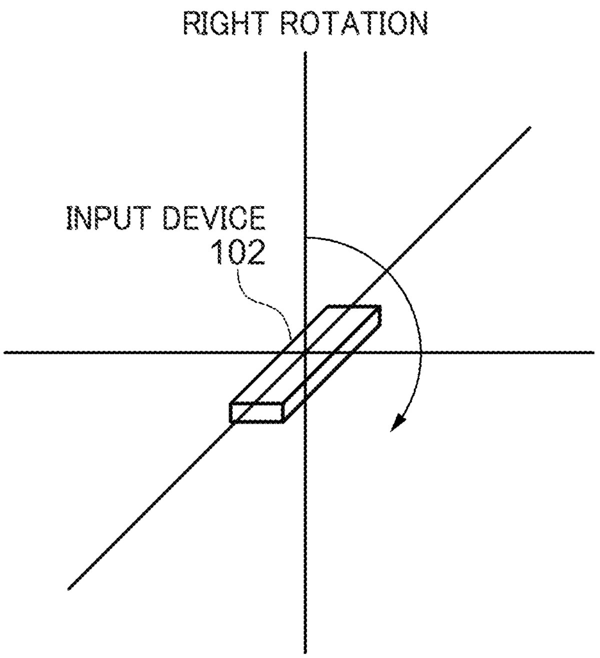
FIGS. 21A and 21B are views showing situations of right rotations of the one-hand controllers in the third embodiment.
Figure 21B:
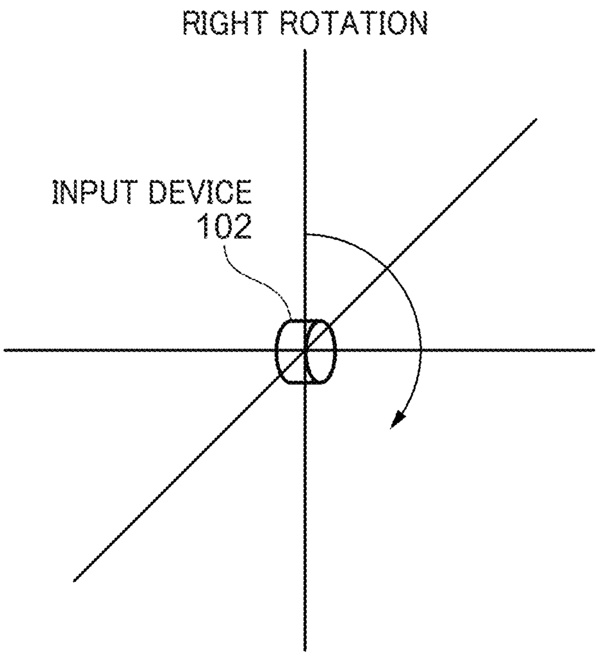

FIGS. 21A and 21B are views showing situations of right rotations of the one-hand controllers in the third embodiment. FIG. 21A is the view showing the situation of the right rotation of the one-hand controller in a case where the input device 102 is the gripping type. FIG. 21B is the view showing the situation of the right rotation of the one-hand controller in a case where the input device 102 is the wearing type. As shown in FIGS. 21A and 21B, in the third embodiment, the right rotation of the one-hand controller means clockwise rotation in viewed from the user in a posture in which the user holds the one-hand controller. Therefore, although not shown, in the third embodiment, the left rotation of the one-hand controller means counterclockwise rotation in viewed from the user in the posture in which the user holds the one-hand controller.

First, a re-holding action detection process in the third embodiment performed in the step S401 will be described with reference to FIGS. 15 and 17 to 20. The re-holding action detection process in the step S401 is executed similarly regardless of whether the input device 102 is the gripping type shown in FIG. 17 or the input device 102 is the wearing type shown in FIG. 18. As shown in FIG. 15, in the subroutine of the re-holding action detection process in the step S401, the re-holding detection unit 301 obtains an angular speed or an angle of the one-hand controller from the gyrosensor in a step S1501. In a step S1502, the re-holding detection unit 301 detects a re-holding action by analyzing an angular speed change or an angle change of the one-hand controller.

Specifically, when the angular speed of the one-hand controller is obtained from the gyrosensor as shown in FIG. 19, the re-holding detection unit 301 detects a spot 1901 as a characteristic of the angular speed change of the one-hand controller that occurs at the time of re-holding. Thus, the re-holding action is detected. The spot 1901 shows the rotation of the one-hand controller defined by the rule. In the spot 1901, the angular speed of the one-hand controller is maintained at a value equal to or more than a threshold value for a time longer than a predetermined time period. In the meantime, when the angle of the one-hand controller is obtained from the gyrosensor as shown in FIG. 20, the re-holding detection unit 301 detects a spot 2001 as a characteristic of the angular change of the one-hand controller that occurs at the time of re-holding. Thus, the re-holding action is detected. The spot 2001 shows the rotation of the one-hand controller defined by the rule. In the spot 2001, the angular change of the one-hand controller in a specified direction is maintained for a time longer than a predetermined time period. The description returns to FIG. 15. After the process in the step S1502 is performed, the flowchart in FIG. 15 is terminated, and the process returns to the flowchart in FIG. 4.

Next, the holding hand determination process in the third embodiment performed in the step S403 will be described with reference to FIGS. 16 to 20. The holding hand determination process in the step S403 is executed similarly regardless of whether the input device 102 is the gripping type shown in FIG. 17 or the input device 102 is the wearing type shown in FIG. 18. As shown in FIG. 16, in the subroutine of the holding hand determination process performed in the step S403, the holding hand determination unit 302 determines the holding hand in a step S1601 based on the direction component of the angular speed or the direction component of the angle.

At this time, the re-holding detection unit 301 obtains the direction component of the angular speed or the direction component of the angle from the detection result in of the step S1502, that is, from the spot indicating the rotation of the one-hand controller as defined in the rule. Specifically, in the case where the angular speed of the one-hand controller is obtained from the gyrosensor as shown in FIG. 19, when the angular speed of the one-hand controller is a positive value, that is, when the direction component is the right rotation as in the spot 1901, it is determined that the user's right hand is the holding hand. In the spot indicating the rotation of the one-hand controller defined by the rule, when the angular speed of the one-hand controller is a negative value, that is, when the direction component is the left rotation, which is contrary to the value in the spot 1901, the user's left hand is determined as the holding hand.

In the meantime, in the case where the angle of the one-hand controller is obtained from the gyrosensor as shown in FIG. 20, when the angle of the one-hand controller changes in the positive direction, that is, in the direction of the right rotation as in the spot 2001, it is determined that the user's right hand is the holding hand. In the spot indicating the rotation of the one-hand controller defined by the rule, when the angle of the one-hand controller changes in the negative direction, that is, in the direction of the left rotation, which is contrary to the direction in the spot 2001, it is determined that the user's left hand is the holding hand. The description returns to FIG. 16. After the process in the step S1601 is performed, the flowchart in FIG. 16 is terminated, and the process returns to the flowchart in FIG. 4.

As mentioned above, the information processing apparatus 101 according to the third embodiment obtains the angular speed or the angle of the one-hand controller. Further, the information processing apparatus 101 detects the re-holding action and determines the holding hand by detecting the characteristic of the angular speed change or the angular change when the one-hand controller collides with the palm or the finger of the user from the angular speed or the angle of the one-hand controller as an obtained result. Accordingly, the information processing apparatus 101 automatically determines the holding hand at the re-holding timing, which promotes the utilization of the input device 102 used for operations in the XR.

In general, the angular speed change or the angular change of the one-hand controller due to rotation defined in the rule does not occur due to an action other than the re-holding action as long as the user securely holds and uses the one-hand controller. However, a change similar to the angular speed change or angular change of the one-hand controller due to the rotation defined by the rule may occur due to an action other than the re-holding action when the user does not securely hold and use the one-hand controller. Therefore, the manufacturer notifies a user that an angular speed change or an angular change of the one-hand controller due to rotation defined by the rule is detected as an angular speed change or an angular change of the one-hand controller due to the re-holding action through the user's manual. Further, the manufacturer refers to the possibility of erroneous detection of the re-holding action in the user's manual.

Also, even if correspondence relation between the rotation direction of the one-hand controller and the holding hand is opposite to the rule described above, the holding hand determination unit 302 can determine the holding hand. Therefore, the information processing apparatus 101 may allow the user to select in advance the correspondence relation between the rotation direction of the one-hand controller and the holding hand, and may define in advance a rule corresponding to the selection. In addition, an angular speed change and an angular change in an actual re-holding action are not represented by a simple combination of line segments as shown in FIGS. 19 and 20. Tendencies of an angular speed change and an angular change also vary among individual users who perform re-holding actions. Therefore, the information processing apparatus 101 may improve the accuracy of the detection of a re-holding action by the re-holding detection unit 301 and the accuracy of the determination of a holding hand by the holding hand determination unit 302 by accumulating data indicating angular speed changes and angular changes in re-holding actions and subjecting the data to machine learning and deep learning.

Hereinafter, a fourth embodiment will be described with reference to FIGS. 22 to 24 and FIGS. 25A and 25B. Hereinafter, differences from the first to third embodiments will be mainly described. In the fourth embodiment, the information processing apparatus 101 determines a use status of the one-hand controller in addition to the holding hand, and further allocates input functions to the input members of the one-hand controller according to the determined holding hand and the use status of the one-hand controller. For example, when presentation is performed in a virtual space, various scenes are conceivable, such as a scene in which an avatar of a user who is a presenter points to a virtual object on a screen as a virtual object, and a scene in which the avatar sends a display page as a virtual object. Therefore, the information processing apparatus 101 allocates input functions optimal for each scene to the input member of the one-hand controller according to the holding hand and the use status of the one-hand controller.

Figure 22:
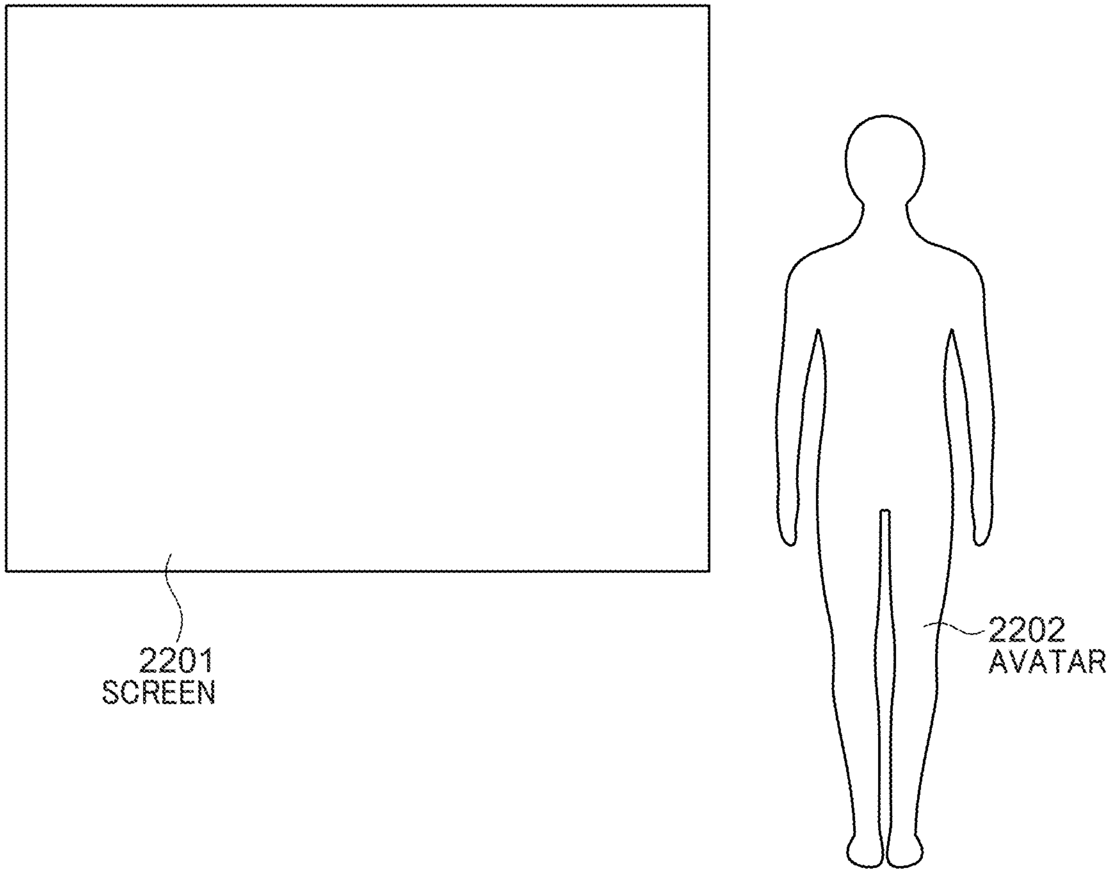
FIG. 22 is a view showing an example of a situation where a presentation is performed in a virtual space in a fourth embodiment.

FIG. 22 is a view showing an example of a situation where presentation is performed in a virtual space. In FIG. 22, a screen 2201 as a virtual object is located on the right side of an avatar 2202 of a user who is a presenter. In such a case, when the presenter holds the one-hand controller by the right hand, the input functions specialized for pointing, such as enlargement and highlight, are preferably allocated to the input members of the one-hand controller. In the meantime, when the presenter holds the one-hand controller by the left hand, the presenter performs pointing with the right hand at the side of the screen 2201, and therefore, it is preferable that the input functions specialized for support, such as page feeding and page returning, are allocated to the input members of the one-hand controller.

Figure 23:
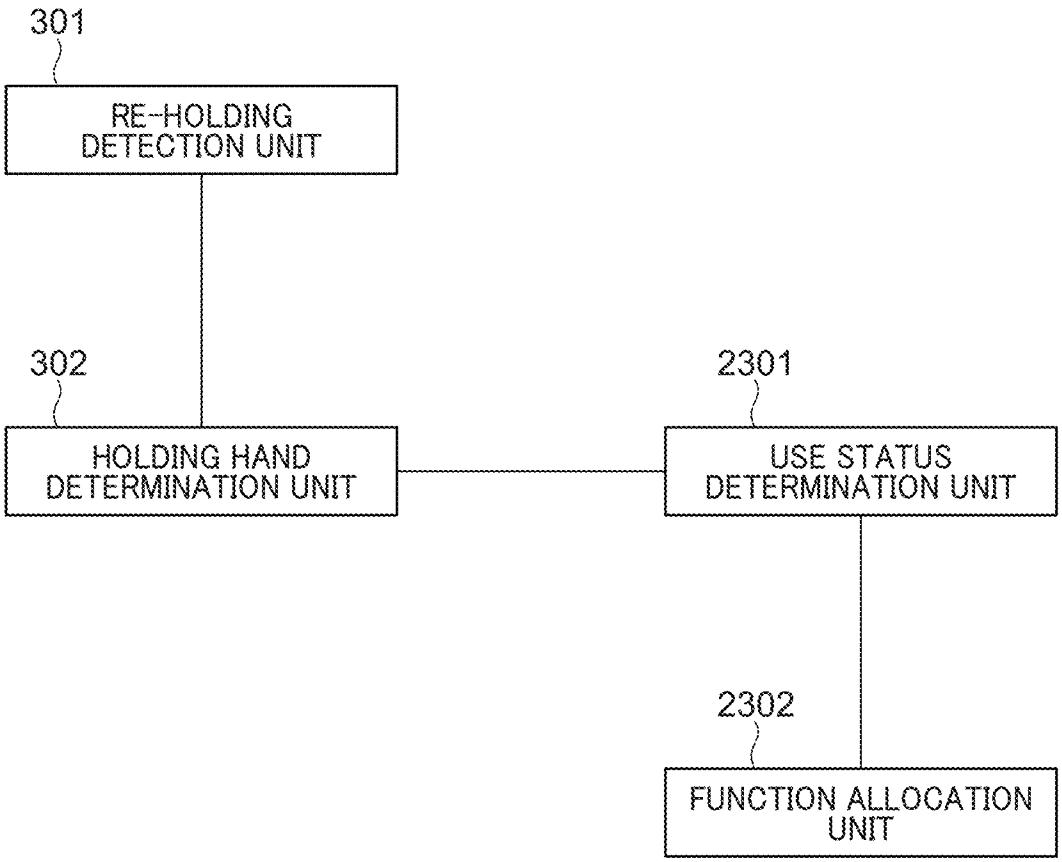
FIG. 23 is a block diagram showing a functional configuration of an information processing apparatus in the fourth and fifth embodiments.

FIG. 23 is a block diagram showing a functional configuration of the information processing apparatus 101. The information processing apparatus 101 includes, as its functional configuration, the re-holding detection unit 301, the holding hand determination unit 302, a use status determination unit 2301, and a function allocation unit 2302. In FIG. 23, the re-holding detection unit 301 and the holding hand determination unit 302 are the same as the re-holding detection unit 301 and the holding hand determination unit 302 shown in FIG. 3, and therefore, the descriptions thereof are omitted. The use status determination unit 2301 (a second determination unit) determines a use status of the one-hand controller. The use statuses of the one-hand controller determined by the use status determination unit 2301 include a user's personal setting related to the one-hand controller, information related to a use form of the one-hand controller in the XR, etc. The function allocation unit 2302 (an allocation unit) allocates the input functions to the input members of the one-hand controller according to the information about the holding hand determined by the holding hand determination unit 302 and the use status of the one-hand controller determined by the use status determination unit 2301.

Figure 24:
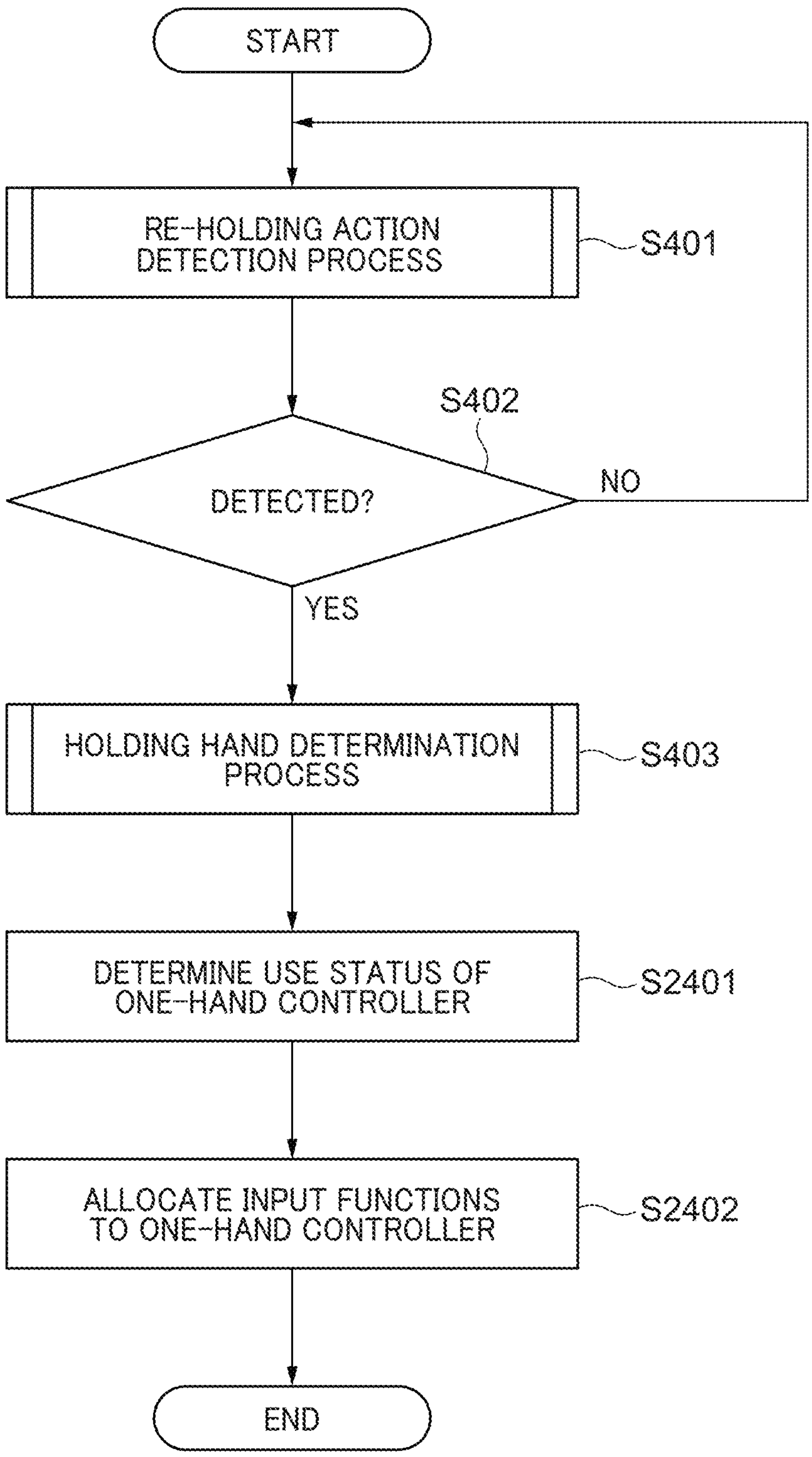
FIG. 24 is a flowchart showing a flow of a process of the information processing apparatus in the fourth and fifth embodiments.

FIG. 24 is a flowchart showing a flow of a process of the information processing apparatus 101 in the fourth embodiment. The flow of the process of the information processing apparatus 101 (a control method for the information processing apparatus) shown in the flowchart in FIG. 24 is achieved by the CPU 111 (computer) developing an information processing program stored in the storage unit 114 to the RAM 113 and executing the information processing program. The steps S401 to S403 in FIG. 24 are the same as the steps S401 to S403 shown in FIG. 4 described above, and thus descriptions thereof will be omitted. In a step S2401, the use status determination unit 2301 determines the use status of the one-hand controller (a second determination step). In the case of the presentation shown in FIG. 22, it is determined that the screen 2201 as the virtual object is located on the right hand side of the avatar 2202 of the user as the presenter as the use form of the one-hand controller in the XR.

In a step S2402, the function allocation unit 2302 allocates the input functions most suitable for the current use status of the one-hand controller to the input members of the one-hand controller according to the holding hand and the use status determined in the steps S403 and S2401 (an allocation process). In the example of the presentation shown in FIG. 22, when it is determined that both the following conditions (1) and (2) are satisfied, the function allocation unit 2302 allocates the input functions optimal for pointing to the input members of the one-hand controller using a pointing function set described later.

(1) The user holds the one-hand controller by the right hand.
(2) The screen 2201 as the virtual object is located on the right hand side of the avatar 2202 of the user who is the presenter.

In the meantime, when it is determined that the user is holding the one-hand controller by the left hand unlike the condition (1), the function allocation unit 2302 allocates the input functions optimal for the support to the input members of the one-hand controller using a support function set described later.

FIGS. 25A and 25B are views respectively showing an example of the pointing function set and an example of the support function set. FIG. 25A is the view showing the example of the pointing function set. FIG. 25B is the view showing the example of the support function set. When using the pointing function set shown in FIG. 25A, the function allocation unit 2302 respectively allocates the input functions, such as enlargement and highlight, to the input members, such as buttons A and B, of the one-hand controller. In the meantime, when using the support function set shown in FIG. 25B, the function allocation unit 2302 respectively allocates the input functions, such as page feeding and page returning, to the input members, such as the buttons A and B, of the one-hand controller. The description returns to FIG. 24. After the process in the step S2402 is performed, the process of the flowchart in FIG. 24 is terminated.

As mentioned above, the information processing apparatus 101 according to the fourth embodiment smoothly allocates the input functions optimal for the current use status of the one-hand controller to the input members of the one-hand controller in accordance with the holding hand and the use form of the one-hand controller in the XR. Thus, the information processing apparatus 101 automatically performs the determination of the holding hand and the allocation of the input functions in the one-hand controller at the re-holding timing, which promotes the utilization of the input device 102 used for operations in the XR.

Hereinafter, a fifth embodiment will be described with reference to FIGS. 26A and 26B. Here, the difference from the fourth embodiment will be mainly described. In the fifth embodiment, the information processing apparatus 101 further allocates input functions to the input members of the one-hand controller according to the dominant hand of the user. For example, when training using a tool is performed in a virtual space, various scenes are conceivable, such as a scene in which a user performs a practical technique using a tool in accordance with explanation by a lecturer and a scene in which a user makes a note with real paper and pencil while listening to explanation by the lecturer. Therefore, the information processing apparatus 101 allocates the input functions optimal for each scene to the input members of the one-hand controller according to the holding hand and the use status of the one-hand controller including the dominant hand of the user.

In the scenes of the training in the fifth embodiment, the use status of the one-hand controller determined in the step S2401 includes a case in which the tool used in the training is an impact driver as a use form of the one-hand controller in the XR. Further, the use status of the one-hand controller determined in the above step S2401 includes information about the dominant hand of the user as the personal setting of the user related to the one-hand controller. In addition, where it is determined that the one-hand controller is held by the dominant hand of the user, the function allocation unit 2302 allocates input functions optimal for a tool operation using the one-hand controller to the input members of the one-hand controller in the step S2402. At this time, the function allocation unit 2302 uses a dominant hand function set described later. In the meantime, when it is determined that the one-hand controller is held by the non-dominant hand of the user, the function allocation unit 2302 allocates input functions that are not related to a tool operation using the one-hand controller to the input members of the one-hand controller in the step S2402. At this time, the function allocation unit 2302 uses a non-dominant hand function set described later.

FIG. 26A is a view showing an example of the dominant hand function set. In the dominant hand function set in FIG. 26A, an impact driver is assumed as the tool used in the scene of the training in the fifth embodiment. FIG. 26B is a view showing an example of the non-dominant hand function set. When the dominant hand function set shown in FIG. 26A is used, the function allocation unit 2302 respectively allocates input functions, such as rotation of a bit and replacement of a bit, to the input members, such as the buttons A and B, of the one-hand controller. In the meantime, when the non-dominant hand function set shown in FIG. 26B is used, the function allocation unit 2302 respectively allocates input functions, such as volume up and volume down, to the input members, such as the buttons A and B, of the one-hand controller.

As mentioned above, the information processing apparatus 101 according to the fifth embodiment smoothly allocates the input functions optimal for the current use status of the one-hand controller to the input members of the one-hand controller according to the holding hand, the use form of the one-hand controller in the XR, and the dominant hand of the user. Thus, the information processing apparatus 101 automatically performs the determination of the holding hand and the allocation of the input functions in the one-hand controller at the re-holding timing, which promotes the utilization of the input device 102 used for operations in the XR.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-118312, filed Jul. 20, 2023, which is hereby incorporated by reference herein in its entirety.

What is claimed is:

1. An information processing apparatus comprising:
a memory device that stores a set of instructions; and
at least one processor that executes the set of instructions to perform operations comprising:
determining a holding hand, based on a distance between a position of the input device and a position of a user's hand, when the user holds the input device that allows a one-hand operation, the position of the user's hand being obtained based on a reality image from a user's viewpoint or a third person's viewpoint;
wherein the determining the holding hand includes,
in a case where a first distance between the position of the input device and a position of a first hand of the user is smaller than a threshold and a second distance between the position of the input device and a position of a second hand, being different from the first hand, of the user is greater than the threshold, determining that the first hand is the holding hand, and
in a case where both the first distance and the second distance are smaller than the threshold and the first distance is smaller than the second distance, determining that the first hand is the holding hand.

2. The information processing apparatus according to claim 1, wherein the operations further comprise:
detecting an action of a user to change a holding hand that holds an input device as a re-holding action based on the distance,
wherein in the detecting the re-holding action, the re-holding action is detected when the first distance changes from a value smaller than the threshold to a value greater than the threshold.

3. The information processing apparatus according to claim 1, wherein the operations further comprise using a position of a gravity center of the user's hand or a position of a joint of the user's hand as the position of the user's hand.

4. The information processing apparatus according to claim 1, wherein the operations further comprise obtaining the position of the user's hand using infrared light.

5. The information processing apparatus according to claim 1, wherein the operations further comprise:
determining a use status of the input device; and
allocating input functions to input members of the input device according to the holding hand determined and the use status determined.

6. The information processing apparatus according to claim 5, wherein the use status includes information regarding to a use form of the input device in cross reality.

7. A control method for an information processing apparatus, comprising:
determining a holding hand, based on a distance between a position of the input device and a position of a user's hand, when the user holds the input device that allows a one-hand operation, the position of the user's hand being obtained based on a reality image from a user's viewpoint or a third person's viewpoint;
wherein the determining the holding hand includes,
in a case where a first distance between the position of the input device and a position of a first hand of the user is smaller than a threshold and a second distance between the position of the input device and a position of a second hand, being different from the first hand, of the user is greater than the threshold, determining that the first hand is the holding hand, and in a case where both the first distance and the second distance are smaller than the threshold and the first distance is smaller than the second distance, determining that the first hand is the holding hand.

8. The control method for an information processing apparatus according to claim 7, further comprising:

determining a use status of the input device; and allocating input functions to input members of the input device according to the holding hand determined and the use status determined.

9. A non-transitory computer readable medium that stores a program, wherein the program causes a computer to execute the control method according to claim 7.

10. The non-transitory computer readable medium according to claim 9, wherein the control method further comprises:

determining a use status of the input device; and allocating input functions to input members of the input device in accordance with the holding hand determined and the use status determined.

11. The information processing apparatus according to claim 1, wherein the input device is used in cross reality.

* * * * *